United States Patent
Fujiwara et al.

(10) Patent No.: US 7,116,247 B2
(45) Date of Patent: Oct. 3, 2006

(54) SECURITY ARRANGEMENT WITH IN-VEHICLE MOUNTED TERMINAL

(75) Inventors: Jiro Fujiwara, Kyoto (JP); Masatoshi Yajima, Kyoto (JP); Atsushi Shimizu, Kyoto (JP); Tanichi Ando, Kyoto (JP); Tomohiko Okundo, Kyoto (JP); Hiroya Ueda, Kyoto (JP)

(73) Assignee: Omron Corporation, Kyoto (JP)

( * ) Notice: Subject to any disclaimer, the term of this patent is extended or adjusted under 35 U.S.C. 154(b) by 189 days.

(21) Appl. No.: 10/897,437

(22) Filed: Jul. 23, 2004

(65) Prior Publication Data

US 2005/0062602 A1 Mar. 24, 2005

(51) Int. Cl.
*G08G 1/14* (2006.01)

(52) U.S. Cl. .............. 340/932.2; 340/426.19; 340/426.2; 340/541

(58) Field of Classification Search ........... 340/541, 340/426.18, 426.2, 426.21, 426.19, 5.53, 340/5.83, 425.5, 539.13, 573.1
See application file for complete search history.

(56) References Cited

U.S. PATENT DOCUMENTS

| | | | | |
|---|---|---|---|---|
| 2,979,706 A | * | 4/1961 | Simon et al. | 340/539.31 |
| 5,055,851 A | * | 10/1991 | Sheffer | 342/457 |
| 6,263,311 B1 | * | 7/2001 | Dildy | 704/273 |
| 6,690,414 B1 | * | 2/2004 | Lyons et al. | 348/156 |
| 6,972,676 B1 | * | 12/2005 | Kimmel et al. | 340/506 |
| 2003/0156030 A1 | * | 8/2003 | Lee et al. | 340/541 |
| 2004/0086093 A1 | * | 5/2004 | Schranz | 379/37 |
| 2004/0095236 A1 | * | 5/2004 | Sobol | 340/506 |

FOREIGN PATENT DOCUMENTS

| JP | 2001-184568 A | 7/2001 |
|---|---|---|
| JP | 2001-245069 A | 9/2001 |

* cited by examiner

*Primary Examiner*—Brent A. Swarthout
(74) *Attorney, Agent, or Firm*—Foley & Lardner LLP

(57) ABSTRACT

A security arrangement has an intrusion detection information input unit for receiving intrusion detection information from an intrusion detection device for detecting an intruding entity entering a predetermined area; and a network communication unit for communicating with an in-vehicle terminal device which is mounted in a vehicle through a communication network. When the intrusion detection information input unit receives the intrusion detection information from the intrusion detection device, the network communication unit transmits information related to the detected intruding entity to the in-vehicle terminal device.

11 Claims, 26 Drawing Sheets

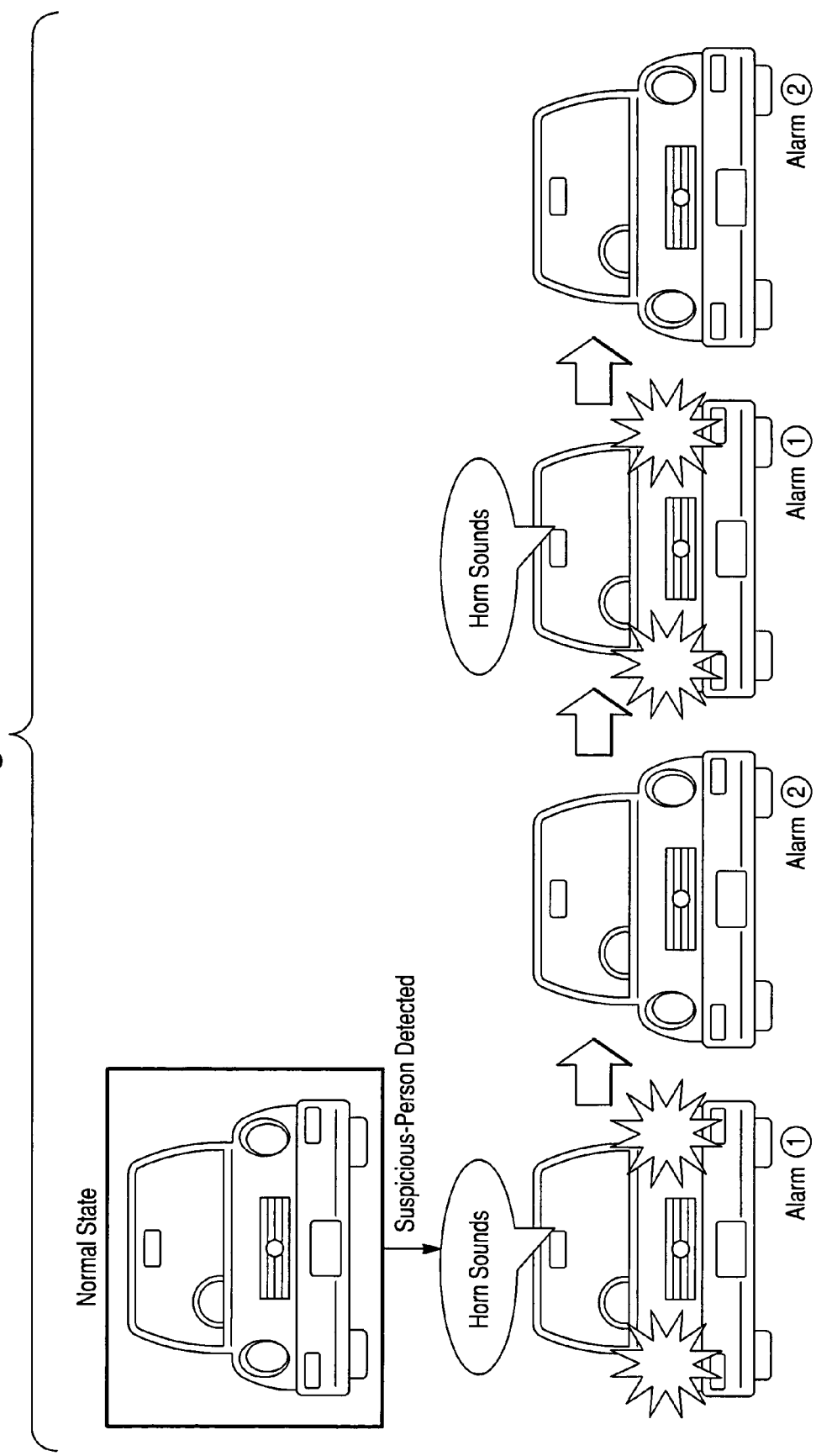

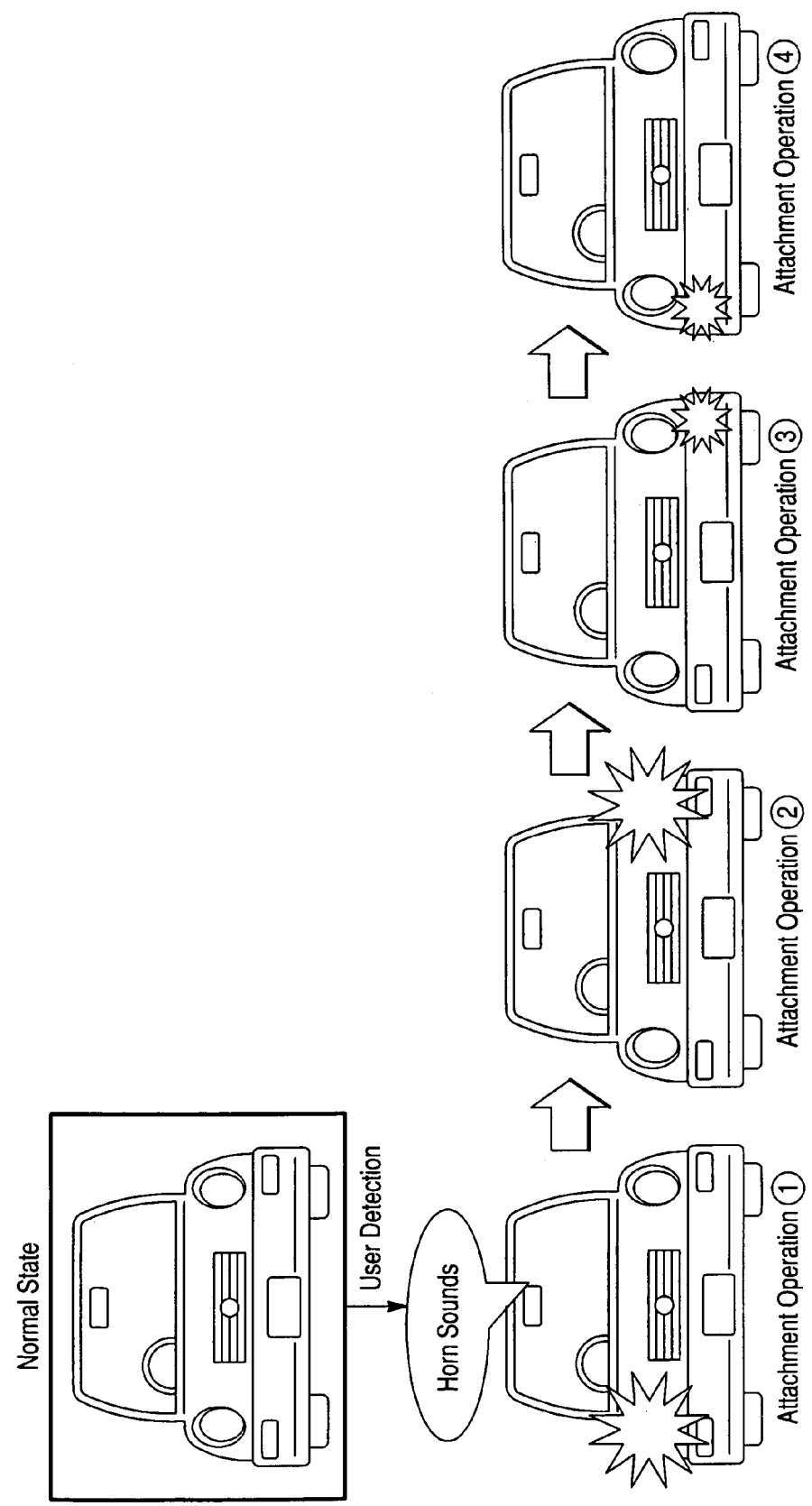

SECURITY ARRANGEMENT WITH IN-VEHICLE MOUNTED TERMINAL

BACKGROUND OF THE INVENTION

1. Field of the Invention

The present invention relates to a security arrangement for managing a home security system or the like, and an in-vehicle terminal device as an information processing system for the vehicle.

2. Description of the Related Art

An option to mount various kinds of information processing systems in a vehicle has recently become popular. Car navigation systems are representative of these type of information processing systems. In car navigation systems, map data recorded in DVD-ROM or the like are read out, the current position of a vehicle is displayed on a map by using GPS (Global Positioning System), and road guidance and other processing are carried out by inputting a destination, for example.

Furthermore, there has been proposed a system in which a hard disk is used as a recording medium for map data, etc., and a wireless communication function is included in the car navigation system to renew the map data through data communications. In addition, there has been also proposed a system in which a personal computer function is included in the car navigation system so that an Internet browser and electronic mail software are usable.

As described above, various proposals concerning high functionalization of the information processing system in a vehicle have been made. However, there has been a problem that utility of such an information processing system is relatively limited.

For example, there are still lots of people who do not have a vehicle particularly in urban areas of Japan because of restricted, expensive parking space, relatively well developed transportation facilities, etc. Even when people do possess vehicles, most of them use trains and busses for everyday commuting, and the time for which these people use vehicles is relatively short. Accordingly, even when a highly functional information processing system is made available, it is rare that the car owner installs it because of the few opportunities for users to actually use the same.

Furthermore, people in continental countries such as the U.S. considered vehicles to be merely a means of transport and have little motivation to spend money on such arrangements. Therefore, in these type of continental countries, expensive information processing arrangements do not enjoy a high popularity. With respect to car navigation systems, an inhibition to wide-spread used resides in that people can relatively easily drive to their destinations without using any navigational assistance.

On the other hand, particularly the United States of America, people have developed a high interest in home security and crime-prevention related products have become more popular than in many other countries.

SUMMARY OF THE INVENTION

The present invention has been implemented in view of the foregoing, and the embodiments thereof are directed to providing an information processing system for a vehicle, that has a security arrangement which uses a crime-prevention (intruder alarm) system and an in-vehicle terminal device.

Accordingly, a security arrangement according to an embodiment of the present invention comprises an intrusion detection information input unit for receiving intrusion detection information from an intrusion detection device which detects an intruder (person animal or the like) entering a predetermined area, and a network communication unit for communicating the intrusion detection to an in-vehicle terminal device. With this arrangement, when the intrusion detection information input unit receives the intrusion detection information from the intrusion detection device, the network communication unit transmits information concerning the intrusion/intrusion thus detected, to the in-vehicle terminal device.

According to the above arrangement, when something or someone enters/intrudes into a predetermined area, the entry of this entity is detected by the intrusion detection device, and this intrusion detection information is received by the intrusion detection information input unit. Then, the network communication unit notifies the information concerning the intruder thus detected, to the in-vehicle terminal device mounted in the vehicle. Accordingly, a user can recognize that an intrusion into the predetermined area has occurred even while he/she is driving in the vehicle.

Accordingly, since notification of an intrusion can be made known to a user by the in-vehicle terminal device, the versatility of the in-vehicle terminal device can be expanded.

While car navigation systems and the like have been popular as an in-vehicle terminal device, the use of such systems is limited to a navigation function and also picture display of TV, DVD or the like and operation of an audio function which has been hitherto known. Accordingly, there has been a problem that the use of these arrangements is restricted by their cost. On the other hand, according to the embodiments of the present invention, reception of intruder detection information can be provided as a new use/application, so that an increase in the popularity of in-vehicle terminal devices is anticipated.

Furthermore, in order to enable the in-vehicle terminal device and implement the function of the present invention, only the limited cost of adding the communication means is needed and thus it is relatively easily introduced. Still furthermore, if the communication means is provided in the in-vehicle terminal device, the use of the communications can be expanded. In this sense, it is expected that an inhibition to the introduction of such communication means is relatively low.

That is, according to the embodiments of the present invention, security related information can be immediately provided to a user even when the user is riding in a vehicle, and the usage of the in-vehicle terminal device can be expanded.

In the above arrangement, the security arrangement according to at least one embodiment of the present invention, is further provided with a data storage unit for storing authentication information data base concerning an intruder. When intrusion detection information is received from the intrusion detection device, the information concerning the intruder thus detected, is collated with the authentication information data base to specify the intruder thus detected, and the network communication unit transmits the information concerning the specified intruder to the in-vehicle terminal device.

According to this arrangement, when an intruder is detected, the intruder is collated with the authentication information data base stored in the data storage unit to identify the intruder, and then the identification information is provided to the in-vehicle terminal device. Accordingly, a user riding in a vehicle can recognize what intruder has entered his or her residence or property, and thus can take some countermeasure in accordance with the type of the intruder, for example, he/she takes no action (i.e., leaves the intruder as it is), returns home or informs the intrusion to a security company or the like.

Furthermore, in the above arrangement, the security arrangement according to this embodiment of the present invention may be designed so that the authentication information data base stores data for identifying which one of: a suspicious person, an acquaintance and another user (e.g. spouse/significant other), the detected intruding entity is.

According to the above arrangement, the user riding in the vehicle can recognize which one of a suspicious person, an acquaintance and another user the intruder is, and thus the user concerned can take a subsequent countermeasure more appropriately.

In addition, the security arrangement according to an embodiment of the present invention may be designed so that the network communication unit transmits image information of the intruder to the in-vehicle terminal device and receives authentication information of the intruder concerned from the in-vehicle terminal device, and the data storage unit renews the authentication information data base on the basis of the authentication information received from the in-vehicle terminal device.

According to the above arrangement, a user riding in a vehicle can check the image of the intruder. Therefore, the user can identify and authenticate the information pertaining to the intruder by checking the image, and thus authenticate the information which is received by the network communication unit. Thereafter, the authenticated information data base is renewed on the basis of the authentication information thus received.

Accordingly, the contents of the authentication information data base can be appropriately updated/renewed at all times, and the precision of the identification of intruders can be enhanced. Furthermore, even a user riding in a vehicle can renew the contents of the authentication information data base. Therefore, as compared with such a situation that it would be otherwise impossible to renew the contents of the authentication information data base unless the security sever device is directly operated, a renewing work can be prevented from being forgotten, and user-friendliness can be enhanced.

Furthermore, in the above arrangement, the embodiment of the security arrangement according to an embodiment of the present invention is further provided with a parking detection information input unit for providing parking detection information indicating parking of the vehicle concerned. Thus, when the vehicle in question is parked in a predetermined parking area, and when the parking detection information is received by the parking detection information input unit, the network communication unit does not transmit the information concerning the detected intruder to the in-vehicle terminal device.

According to the above arrangement, when the vehicle is parked in a predetermined parking area, information concerning a detected intruder is not transmitted to the in-vehicle terminal device. That is, the fact that the vehicle is parked in the parking area is assumed to mean that there are no users in the vehicle, and thus it is insignificant that the information concerning the intruder be transmitted to the in-vehicle terminal device in such a case. Accordingly, unnecessary communication processing can be avoided by controlling the transmission as described above, so that the communication cost can be reduced or the load of the communication processing in the security arrangement can be reduced.

Furthermore, the security arrangement according to an embodiment of the present invention is further provided with an input unit for accepting an input from a user, and it may be designed so that the network communication unit transmits a message created on the basis of an input from a user to the in-vehicle terminal device and also receives a message from the user riding in the vehicle.

According to the above arrangement, the network communication unit can transmit a message input from the input unit of the security arrangement by a user to a user riding in a vehicle, and also receive a message from the user riding in the vehicle. Accordingly, when the security arrangement is installed in a residence and/or property, a user in the residence can provide information to a user riding in a vehicle, and the user riding in the vehicle can then reply to the user at home. That is, the above arrangement can further expand the usage of the in-vehicle terminal device.

An embodiment of an in-vehicle terminal device according to the present invention which is mounted in a vehicle is provided with a network communication unit for carrying out communication processing through a communication network with a security arrangement described above, a display unit for displaying information, and an input unit for accepting an input from a user, wherein the display unit displays information concerning a detected intruder which is transmitted from the security arrangement.

According to the above arrangement, the fact that some entity (person, animal or the like) enter into a predetermined area/space is transmitted from the security arrangement, and the information concerning the intruder is displayed on the display unit. Accordingly, the user can recognizes the fact that something or someone has entered/intruded into the predetermined area (e.g. residential property/residence) even when the user is moving in a vehicle.

Notification of the intruder to the user is carried out by an in-vehicle terminal device mounted in a vehicle, and thus the usage of the in-vehicle terminal device can be expanded. Accordingly, propagation of the in-vehicle terminal device can be further promoted.

That is, according to the above arrangement, information concerning security issues can be immediately supplied to a user riding in a vehicle, and the usage of the in-vehicle terminal device can be expanded.

A security arrangement according to an embodiment of the present invention is provided with an intrusion detection information input unit for receiving intrusion detection information from an intrusion detection device for detecting intrusion of a person into a predetermined area, a parking detection information input unit for receiving parking detection information indicating parking of a vehicle from a parking detection device for detecting whether the vehicle is parked in a predetermined parking area, and a network communication unit for carrying out communication processing through a communication network with an in-vehicle terminal device mounted in a vehicle, wherein when the intrusion detection information input unit receives the intrusion detection information from the intrusion detection device and the parking detection information input unit receives the parking detection information, the network communication unit instructs the in-vehicle terminal device to makes a threat behavior by the vehicle.

According to the above arrangement, when someone intrudes/invades into a predetermined area, the intrusion is detected by the intrusion detection device, and the intrusion detection information is received by the intrusion detection information input unit. When the parking detection information indicating that a vehicle is parked in a predetermined parking area is received from the parking detection device at the parking detection information input unit, an instruction to have the vehicle issue a warning is transmitted to the in-vehicle terminal device. Accordingly, for example when the parking area is in the predetermined area or in the neighborhood of the predetermined area, the warning is issued from the vehicle to the intruder. Accordingly, the intruder may develop the impression that someone is in the vehicle, or is taken aback by the alarm being issued from an unexpected place, so that the intruder is more apt to flee the scene immediately.

Furthermore, since the vehicle itself is used for emitting such an alarm, it is unnecessary to additionally equip the home security with the same type of alarm device and thus the security system architecture can be simplified. Here, while it is necessary to equip a vehicle with an in-vehicle terminal device, such an in-vehicle terminal device can be also used as a car navigation system, so that the inhibition to providing such an in-vehicle terminal device is reduced.

Upon receiving a warning instruction from the security arrangement, the warning is generated by the in-vehicle terminal device mounted in the vehicle, and thus the usage of the in-vehicle terminal device can be expanded. That is, a new usage such as reception of a warning instruction and control of a warning operation can be provided to the in-vehicle terminal device, and thus the propagation of the in-vehicle terminal device can be further promoted.

Furthermore, in order to enable the in-vehicle terminal device to implement the function of the present invention, only the cost of providing the communication means is incurred and thus it is relatively inexpensively introduced. Still furthermore, if the communication means is included in the in-vehicle terminal device, the usage using communications can be expanded. It is expected that the inhibition to the introduction of such communication means is relatively low.

In the above arrangement, the security arrangement according to this embodiment of the present invention is further provided with a data storage unit for storing authentication information data base concerning intruders, and it may be designed so that when intrusion detection information is received from the intrusion detection device, information concerning a detected intruder is collated with the authentication information data base to identify whether the detected intruder is a suspicious person or not, and the network communication unit issues an instruction to the in-vehicle terminal device to induce the vehicle to issue the warning only when the intruder is found to be what is classified as being a suspicious person.

According to the above arrangement, when an intruder is detected, the intruder data is collated with the authentication information in the data base stored in the data storage unit to identify whether the intruder in question is a suspicious person or not. Only when the intruder is identified as a suspicious person, the warning is carried out. Accordingly, a warning can be prevented from being issued when the intruder is an acquaintance or one of a number of users.

In the above arrangement, the embodiment of the security arrangement according to the present invention may be designed so that when intrusion detection information is received from the intrusion detection device, the information concerning the detected intruder is collated with the authentication information data base to identify whether the detected intruder is a user or not, and the network communication unit instructs the in-vehicle terminal device so that the vehicle is induced to carry out an attachment operation (performance) only when the intruder is a user.

According to the above arrangement, when an intruder is detected, the intruder data thus collected is collated with the authentication information data base stored in the data storage unit to identify whether the intruder is a user or not, and an attachment operation is carried out only when the intruder is a user. Such an attachment operation is carried out by the in-vehicle terminal, so that the user feels as if he/she has a rapport with the vehicle. That is, a favorite toy function can be provided in the vehicle, and thus the favorite toy function enables the vehicle to behave like a living being, so that the user is apt to accept the vehicle like a favorite pet.

According to the above arrangement, the vehicle which is provided with the in-vehicle terminal is able to threaten or warn a suspicious person and also behave like a pet fawning on a user. With the system constructed thus, a user feels an affinity with his/her vehicle (constituting part of a security system) as a member of family or pet, and thus it suppress the user experiencing discomfort due to the awareness that he/she is monitored by the monitoring system at all times.

Furthermore, an in-vehicle terminal device according to the embodiment of the present invention which is mounted in a vehicle is provided with a network communication unit for carrying out communication processing through a communication network with the above security arrangement, and an operation controller for enabling a vehicle to carry out a warning and/or an attachment operation, wherein when the network communication unit receives a warning operation instruction and/or an attachment operation instruction is received from the security arrangement, the in-vehicle terminal is induced to carry out/implement the action concerned.

According to the above arrangement, when some person invades/intrudes into a predetermined area, the vehicle can be made to issue a warning and/or an attachment operation to the intruder concerned on the basis of an instruction from the security arrangement. Accordingly, when the intruder is a suspicious person, the vehicle is induced to issue a warning to the intruder, whereby the vehicle can be made to function as a part of the security system. In addition, when the intruder is a user, the vehicle is induced to execute the attachment operation for the user, whereby the user can be made to feel as if the vehicle is a user's pet.

The control of the warning and attachment operation of the vehicle is carried out by the in-vehicle terminal device mounted in the vehicle, so that the usage of the in-vehicle terminal device can be expanded as described above. Accordingly, propagation of the in-vehicle terminal device can be further promoted.

Furthermore, in the above arrangement, the in-vehicle terminal device may be designed so that the operation controller carries out at least one of each head lamp, a horn, each turn indicator and each wiper so that the vehicle is induced to execute the warning and/or the attachment operation.

According to the above arrangement, the vehicle can be induced to execute the warning and/or the attachment operation by using the above elements which are already provided in the vehicle. Therefore, it is unnecessary to add a new constituent element to the vehicle, and thus the system as described above can be easily introduced.

BRIEF DESCRIPTION OF THE DRAWINGS

FIG. 20 is a diagram showing a specific example of the warning being issued by a vehicle;

FIG. 21 is a diagram showing a specific example of the attachment operation of a vehicle;

FIGS. 22A and 22B are diagrams showing specific examples of a movable portion being provided on a vehicle, wherein FIG. 22A shows an example when a movable portion mimics ears of an animal, and FIG. 22B shows an example when a movable portion mimics a wagging tail of an animal;

DETAILED DESCRIPTION OF THE PREFERRED EMBODIMENTS

Preferred embodiments according to the present invention will be described hereunder with reference to the accompanying drawings FIG. 1 to FIG. 25.

Figure 2:
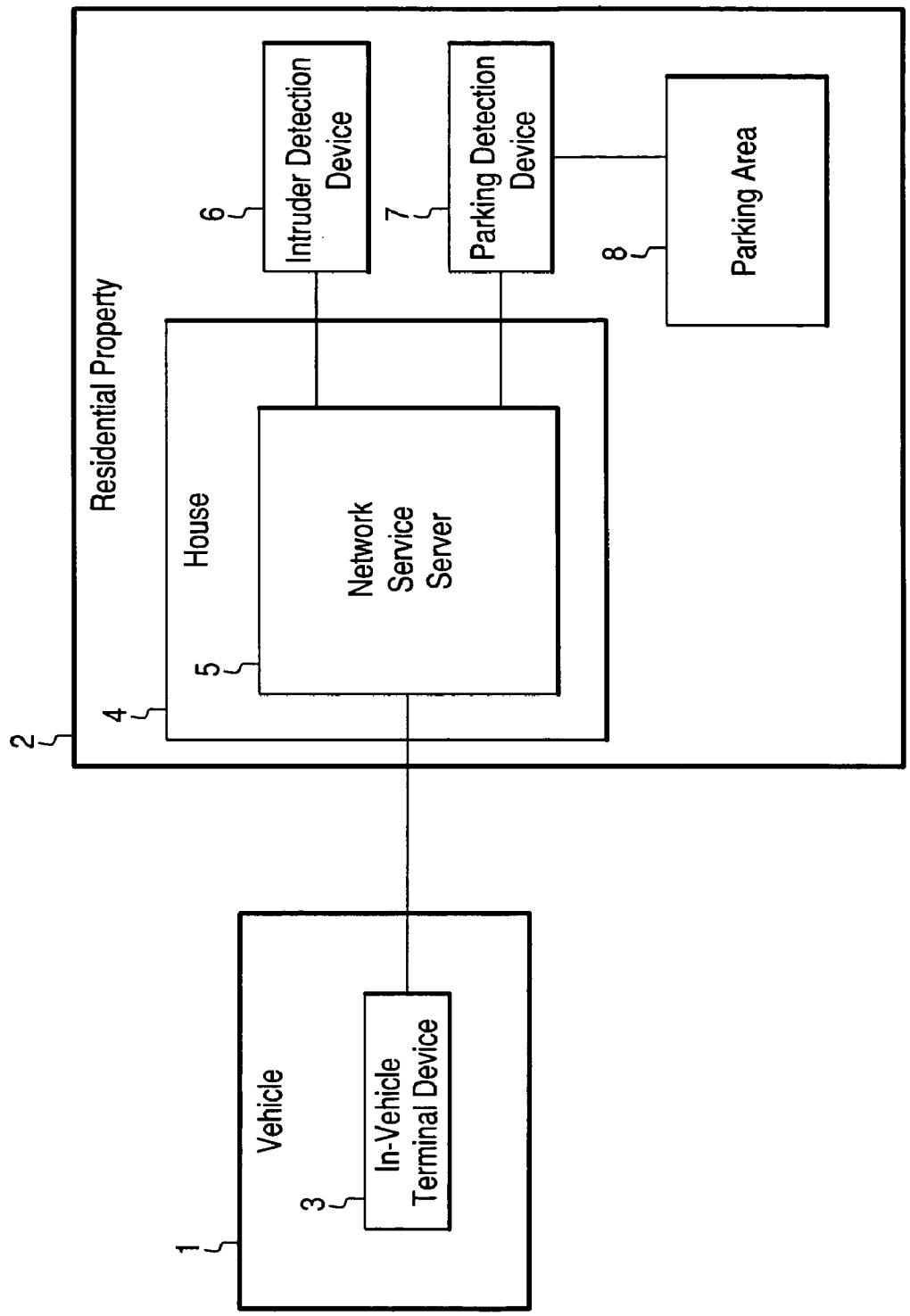
FIG. 2 is a block diagram showing the construction of a security system.

A security system/arrangement according to an embodiment of the present invention is constructed as shown in a block diagram of FIG. 2. That is, The security system of this embodiment is a system comprising a vehicle 1 and a residential property 2 (house, land/grounds, garage etc.,).

The vehicle 1 can include both private vehicle and commercial vehicles, for example, and includes vehicles which can move under the power of an internal combustion or electrical motor. The vehicle 1, for the sake of disclosure of also includes two-wheeled vehicles motorcycles and the like. The vehicle 1 is provided with an in-vehicle terminal device 3.

The in-vehicle terminal device 3 is a computer terminal having an information processing function of providing various kinds of information to passengers in the vehicle 1 and controlling various operations of the vehicle 1. The in-vehicle terminal device 3 is provided with a display unit for displaying various kinds of information, an input unit for inputting various kinds of information, and a communication unit for carrying out wireless communications with an external computer (not shown), etc.

The residential property 2 for the sake of disclosure should be taken to mean an area where a user (inhabitant) of the security system lives, that is, an area including a house 4 as a residence, a parking area 8 such as a garage and a yard containing a garden, a storage, etc. A network service server (security server device) 5 is disposed in the house 4, and an intrusion detection device 6 and a parking detection device 7 are connected to the network service server 5.

In the following description, a user should be taken to mean an inhabitant or inhabitants who live in the residential property 2.

The network service server 5 is a server computer playing a central role in the security system, and carries outs various kinds of processing as will be described later. The network service server 5 is allowed to establish communications with the in-vehicle terminal device 3 of the vehicle 1. The network service server 5 is basically set up in the house 4, however, it may be set up at any place insofar as it can fulfill its function.

The intrusion detection device 6 is a device for detecting a suspicious person having intruded onto the residential property 2 or into the house 4, and comprises one or more of an infrared sensor, an electromagnetic wave radar, a door (window) open/close detecting sensor, a living body sensor or the like. That is, the intrusion detection device 6 is set up at each of plural places in the residential property 2. The parking detection device 7 is a device for detecting whether the vehicle 1 is parked in the parking area 8, and can comprises an infrared sensor, a weight sensor or the like, for example.

Although not shown in FIG. 2, a communication network for implementing communications between the in-vehicle terminal device 3 and the network service server 5 is provided. This communication network can comprise a cellular phone network, a public network such as the Internet or the like and a private network such as Bluetooth (registered trademark), wireless LAN or the like for enabling wireless communications of the in-vehicle terminal device 3. The network service server 5 may be connected through the communication network to a central management server set up in a security company. In this case, the security company can collectively manage information transmitted from each network service server and take a countermeasure, for example, the security company can dispatch security personnel to the place concerned or make contact with a police or fire department when an abnormality occurs.

Figure 1:
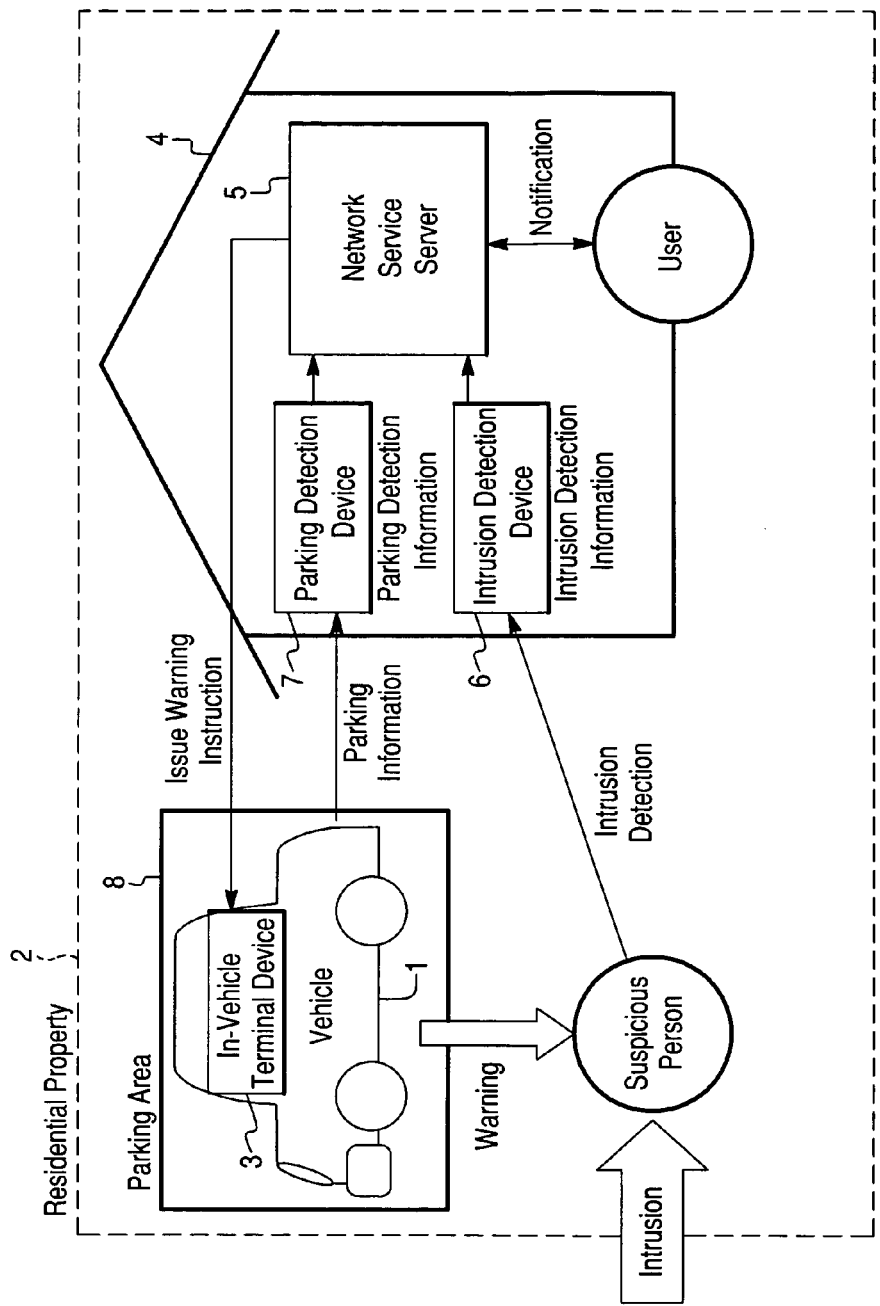
FIG. 1 is a diagram showing an example of a first security operation in a security system according to an embodiment of the present invention.

Next, a first security operation in the security system will be described with reference to FIG. 1.

According to the first security operation, when a suspicious person intrudes into the residential property 2, the intrusion is detected, a vehicle 1 parking in the parking area 8 is induced to generate a warning to the intruder, and at the same time, the intrusion of the suspicious person is brought to the user's attention.

First, when the suspicious person intrudes into the residential property 2, the intrusion is detected by the intrusion detection device 6, and this intrusion detection information is transmitted to the network service server 5. Upon receiving the intrusion detection information from the intrusion detection device 6, the network service server 5 inquires to the parking detection device 7 about whether the vehicle 1 is parked in the parking area 8. Here, when it is confirmed that the vehicle 1 is parked in the parking area 8, the network service server 5 instructs the in-vehicle terminal device 3 of the vehicle 1 to take a warning to the suspicious person.

Here, the communications between the in-vehicle terminal device 3 of the vehicle 1 parking in the parking area 8 and the network service server 5 are made through the communication network in the residential property 2, for example, Bluetooth (registered trademark), wireless LAN or the like. When such a communication network is used, the communication cost can be more remarkably reduced as compared with a case where a public telephone network such as a cellular phone or the like is used.

Upon receiving the warning instruction from the network service server 5, the in-vehicle terminal device 3 controls the vehicle 1 to issue the warning. Here, the warning may take the form of honking the horn, blaring a newly added sound source (output an alarm sound or composite sound), turning on/off a light group such as headlights, tail lamps, turn indicators, etc., starting the engine or moving some movable member/element on the vehicle.

On the other hand, upon receiving the intrusion detection information, the network service server 5 notifies the intrusion to the user in the residential property 2. A method of outputting an alarm sound in the housing 4, notifying the intrusion to a cellular phone owned by the user or the like may be used as a notifying method.

According to the security operation as described above, the suspicious person who intrudes into the residential property 2 is altered by the warning of the vehicle 1. Therefore, the suspicious person may be given the illusion that someone is in the vehicle 1 or is scared by the alarm coming from an unexpected place, with the result that the intruder will leave immediately.

Furthermore, since the vehicle 1 is used as a device for outputting such an alarm, it is unnecessary to redundantly provide a separate alarm device and thus the security system can be easily constructed. Here, the vehicle 1 is needed to be provided with the in-vehicle terminal device 3. However, such an in-vehicle terminal device 3 can be also used as a car navigation system or the like. Therefore, reticence to provide the in-vehicle terminal device 3 as described above is relatively low.

In the above embodiment, when it is detected that the suspicious person intrudes into the residential property 2, the vehicle 1 emits various kinds of warnings. Here, the vehicle 1 may be made to issue not only the warning, but also an attachment operation like making a sound, turning on/off the turn indicators or operating a movable portion as an attachment operation when a user comes back to the residential property 2. The attachment operation of the vehicle 1 as described above will be described in detail later.

Figure 3:
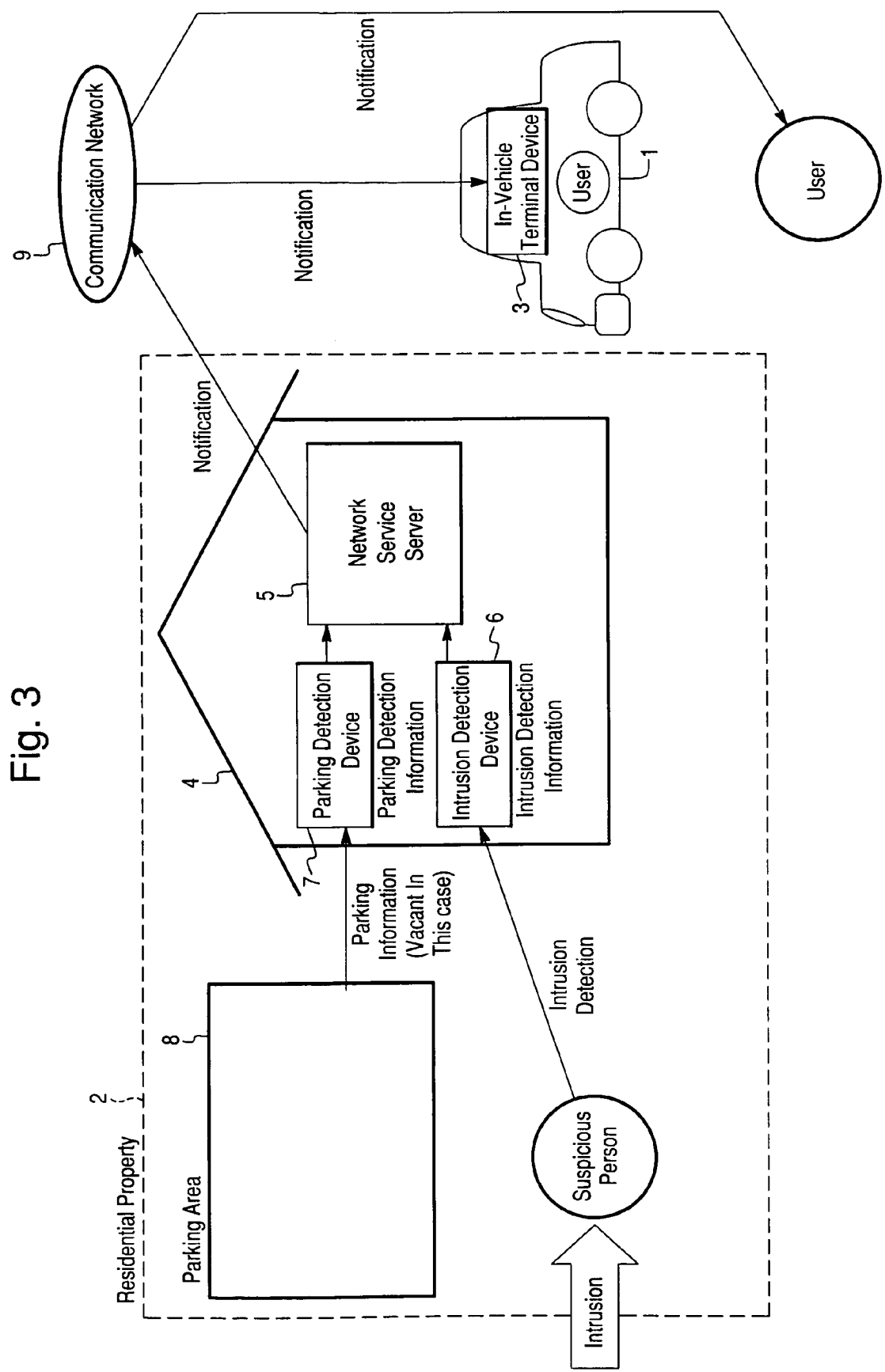
FIG. 3 is a diagram showing an example of a second security operation in the security system.

Next, a second security operation of the security system will be described with reference to FIG. 3.

According to the second security operation, when a suspicious person intrudes into the residential property 2, the intrusion is detected, and the intrusion of the suspicious person is provided to a user who is out riding in vehicle 1 or a user who leaves home without the vehicle 1.

First, when the suspicious person intrudes into the residential property 2, the intrusion is detected by the intrusion detection device 6, and this intrusion detection information is transmitted to the network service server 5. Upon receiving the intrusion detection information from the intrusion detection device 6, the network service server 5 samples the output of the parking detection device 7 to determine if the vehicle 1 is parked in the parking area 8. When it is confirmed that the vehicle 1 does not parked in the parking area 8, the network service server 5 issues information (issues a notification) indicating the intrusion by the suspicious person into the residential property 2, through the communication network 9 to the in-vehicle terminal device 3 of the vehicle 1.

Here, the communications between the in-vehicle terminal device 3 of the vehicle 1 away from home and the network service server 5 are carried out through a public telephone network, a cellular phone or the Internet or the like. By using the communications based on the cellular phone network, the communications can be performed even when the vehicle 1 is running.

Upon receiving information concerning the intrusion by the suspicious person from the network service server 5, the in-vehicle terminal device 3 displays this information on a display unit together with an alarm sound, thereby notifying the user riding in the vehicle of the fact that the suspicious person has intruded into the residential property 2.

The network service server 5 may also notify the intrusion of the suspicious person to the in-vehicle terminal device 3 and also to a user who is away from home. A cellular phone, a portable terminal or the like which is possessed by the user may be used as a notifying method.

According to the security operation as described above, even when a user rides in a vehicle away from home, intrusion by the suspicious person would be provided to the in-vehicle terminal device 3 if the intrusion of the suspicious person in the residential property 2 is detected, so that the user can recognize the intrusion concerned. Accordingly, if the user is around the residential property 2, he/she can return to the residential property 2 or inform to a neighbor.

Figure 4:
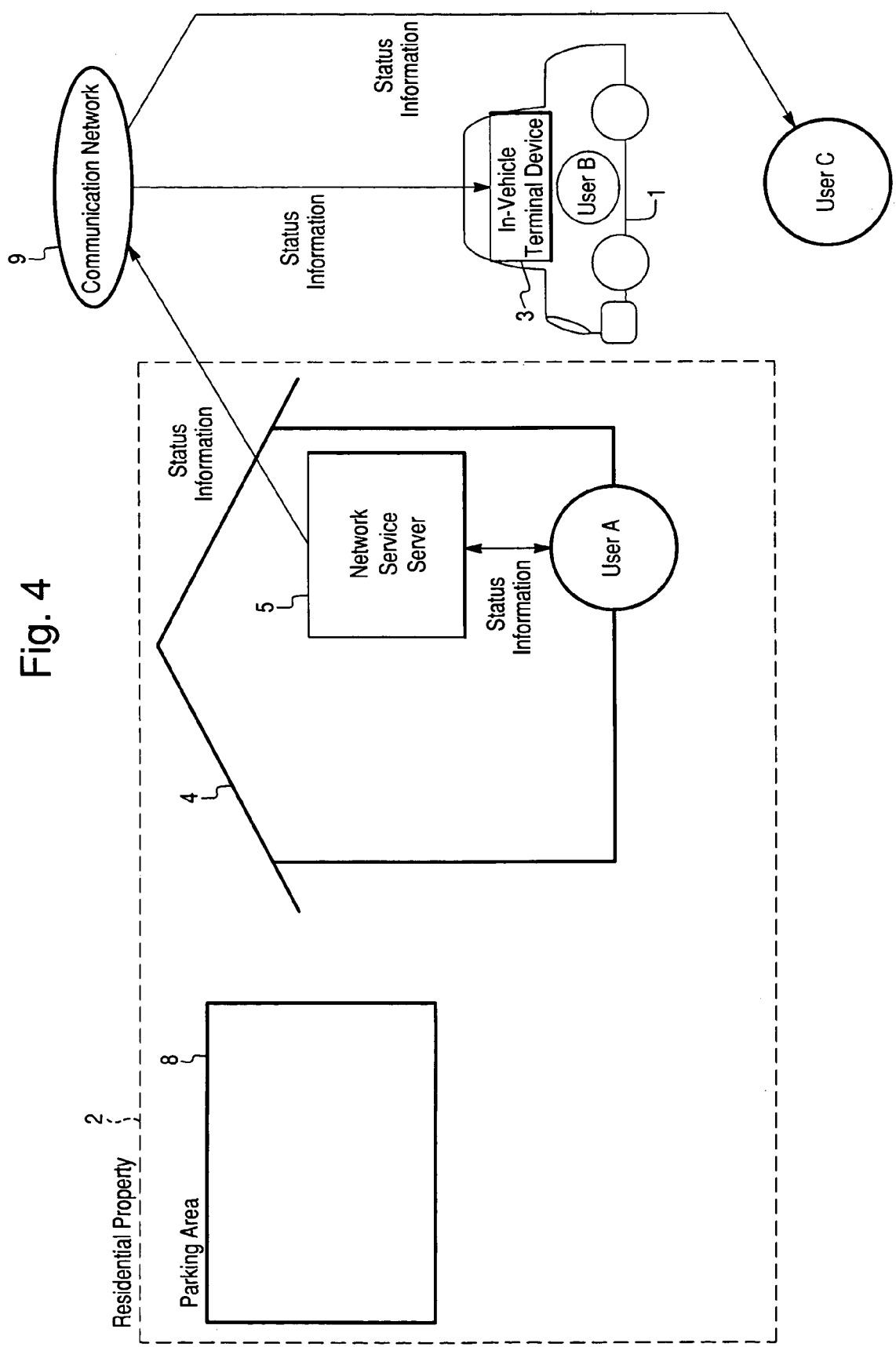
FIG. 4 is a diagram showing an application of the second security operation in the security system.

By using the system in the second security operation described above, some message (in this case, status information as an example) can be received/transmitted between a user A at home 4 and a user riding in a vehicle 1. This example is shown in FIG. 4. First, the user A instructs the in-vehicle terminal device 3 to transmit a message (status information) by operating the network service server 5. Upon receiving the message transmitting instruction, the network service server 5 transmits this message to the in-vehicle terminal device 3 through the communication network 9.

Upon receiving the message from the network service server 5, the in-vehicle terminal device 3 displays this message on the display unit to notify the message from the user A to the user B riding in the vehicle 1. Conversely, a message from the user B riding in the vehicle 1 can be transmitted from the in-vehicle terminal device 3 to the network service server 5.

Likewise, the system may be designed so that a message can be transmitted/received between the network service server 5 and a cellular phone or portable terminal owned by a user C who is away from home.

Next, the constructions of the network service server 5, the intrusion detection device 6, the parking detection device 7 and the in-vehicle terminal device 3 can be described in detail.

Figure 5:
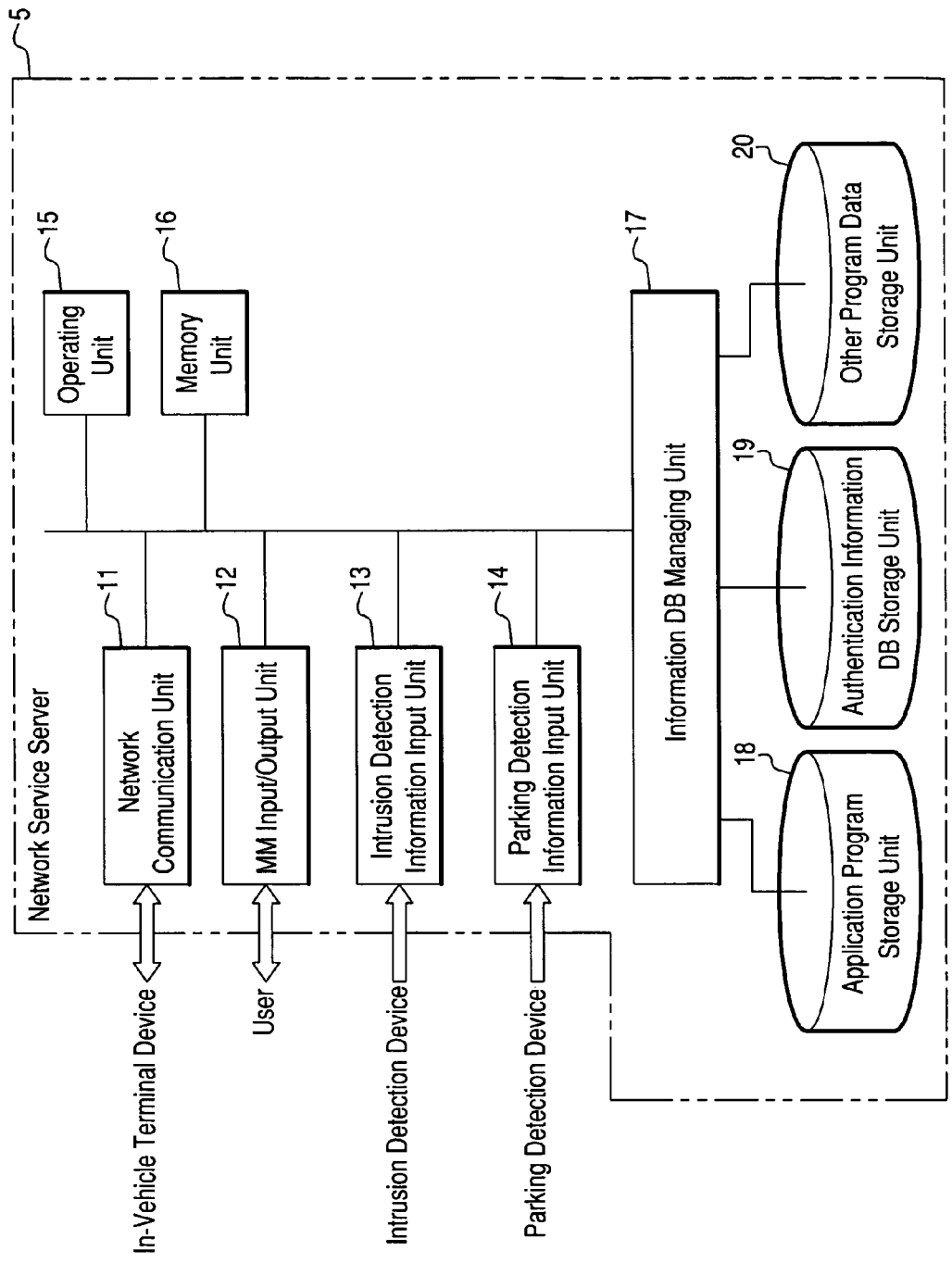
FIG. 5 is a block diagram showing the construction of a network service server.

The network service server 5 comprises a network communication unit 11, an MM (man/machine) input/output unit 12, an intrusion detection information input unit 13, a parking detection information input unit 14, an operating unit 15, a memory unit 16 and an information DB (data base) managing unit (data storage unit) 17 as shown in the block diagram of FIG. 5.

The network communication unit 11 establishes communications with the in-vehicle terminal device 3, and functions as a communication interface. The network communication unit 11 is constructed by a modem or terminal adaptor connected to a public telephone line or an LAN interface when it is connected to the communication network through LAN.

The MM input/output unit 12 includes a display unit such as a monitor or the like, an input unit such as a keyboard, a mouse, a ten key pad, a bar code reader or the like and an output unit such as a printer or the like. The user is enabled to operate the network service server 5 by the MM input/output unit 12.

The intrusion detection information input unit 13 receives intrusion detection information from the intrusion detection device 6. The parking detection information input unit 14 receives parking detection information from the parking detection device 7.

The operating unit 15 carries out an operation to perform various kinds of information processing in the network service server 5, and it comprises CPU (Central Processing Unit), for example. The memory unit 16 functions as a work memory when the operation of the operating unit 16 is carried out.

The information DB managing unit 17 functions as a data storage unit in the network service server 5, and it comprises a large-capacity rewritable recording medium such as a hard disk device or the like. The information DB managing unit 17 is divided into an application program storage unit 18, an authentication information DB storage unit and other program data storage unit 20. The application program storage unit 18 is a block for storing application programs to implement each kind of information processing in the network service server 5.

The authentication information DB storage unit 19 is a block for storing authentication information to identify whether a person entering a residential property 2 is a suspicious person, an acquaintance or a user. The other program data storage unit 20 is a block for storing an OS program of the network service server 5, various kinds of programs which are not relevant to the security system, such as a word processing software, a table calculation software, etc., and other kinds of data.

Figure 6:
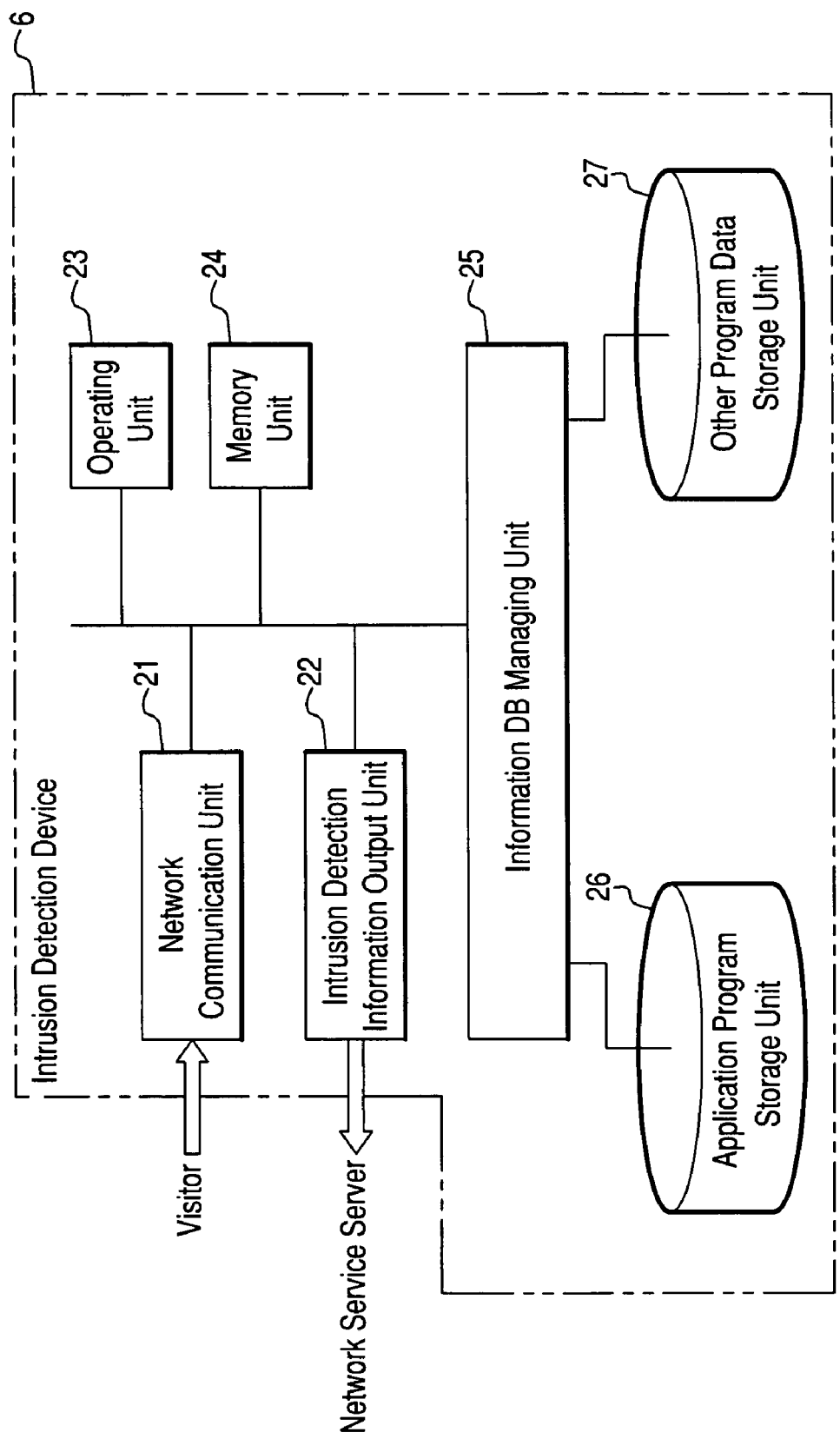
FIG. 6 is a block diagram showing the construction of an intrusion detection device.

As shown in the block of FIG. 6, the intrusion detection device 6 comprises an intrusion detection sensor unit 21, an intrusion detection information output unit 22, an operating unit 33, a memory unit 24 and an information DB managing unit 25.

The intrusion detection sensor unit 21 is a sensor for detecting that a person (suspicious person, acquaintance, user) intrudes into a residential property 2. It is assumed that the intrusion detection sensor unit 21 comprises a living body sensor, an infrared sensor (light intercepting sensor) or the like, however, the present invention is not limited to these sensors and any sensor may be used insofar as it can detect intrusion of a person or the like.

An intrusion detection information output unit 22 transmits the intrusion detection information detected by the intrusion detection sensor unit 21 to the intrusion detection information input unit 13 in the network service server 5.

An operating unit 23, a memory unit 24 and an information DB managing unit 17 are substantially the same functional blocks as the operating unit 15, the memory unit 16 and the information DB managing unit 17 in the network service server 5 described above, and thus the description thereof is omitted. The authentication information DB storage unit 19 contained in the information DB managing unit 17 may not be provided with the intrusion detection device 6. Conversely, the authentication information DB may be provided only on the intrusion detection device 6 side. When it is merely needed to provide only a function of directly outputting a result detected by the intrusion detection sensor unit 21 from the intrusion detection information output unit 22, the intrusion detection device 6 may be modified so that it is not provided with the operating unit 23, the memory unit 24 and the information DB managing unit 17.

Figure 7:
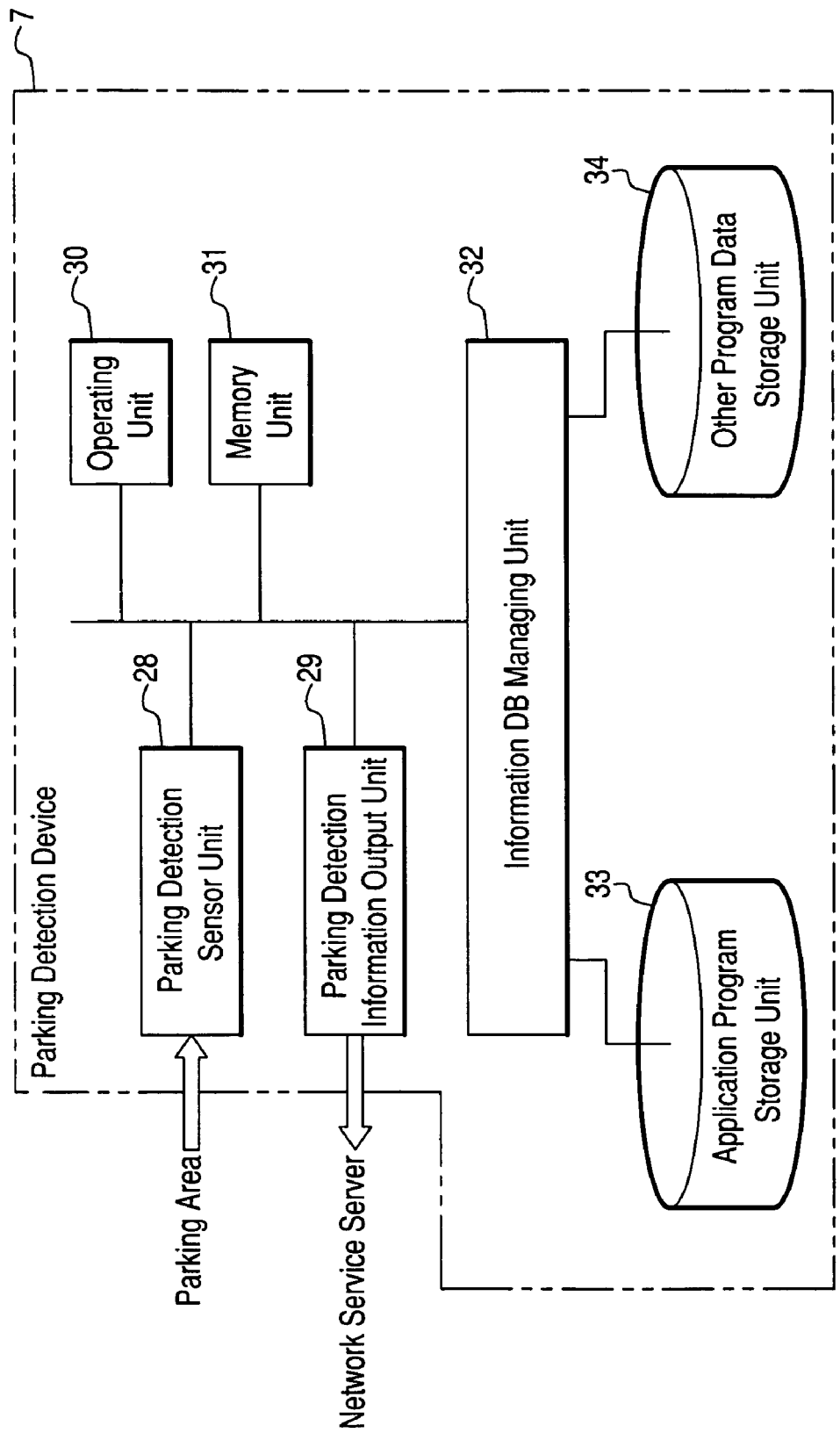
FIG. 7 is a block diagram showing the construction of a parking detection device.

As not shown in the block diagram of FIG. 7, the parking detection device 7 comprises a parking detection sensor unit 28, a parking detection information output unit 29, an operating unit 30, a memory unit 31 and an information DB managing unit 32.

The parking detection sensor unit 28 is a sensor for detecting whether the vehicle 1 is parked in the parking area 8. The parking detection sensor unit 28 is assumed to be constructed by a weight sensor, an infrared sensor (light intercepting sensor) or the like, however, it is not limited to these sensors. Any sensor may be used insofar as it can detect whether the vehicle 1 is parked in the parking area 8.

A parking detection information output unit 29 transmits the parking detection information detected by the parking detection sensor unit 28 to the parking detection information input unit 14 of the network service server 5.

An operating unit 30, a memory unit 31 and an information DB managing unit 32 are substantially the same functional blocks as the operating unit 15, the memory unit 16 and the information DB managing unit 17 of the network service server 5 described above, and thus the description thereof is omitted. The authentication information DB storage unit 19 contained in the information DB managing unit 17 may not be provided to the parking detection device 7. Furthermore, when it is merely needed to provide only a function of directly outputting a result detected by the parking detection sensor unit 28 from the parking detection information output unit 29, the parking detection device 7 may be designed so that it is not provided with the operating unit 30, the memory unit 31 and the information DB managing unit 32.

Figure 8:
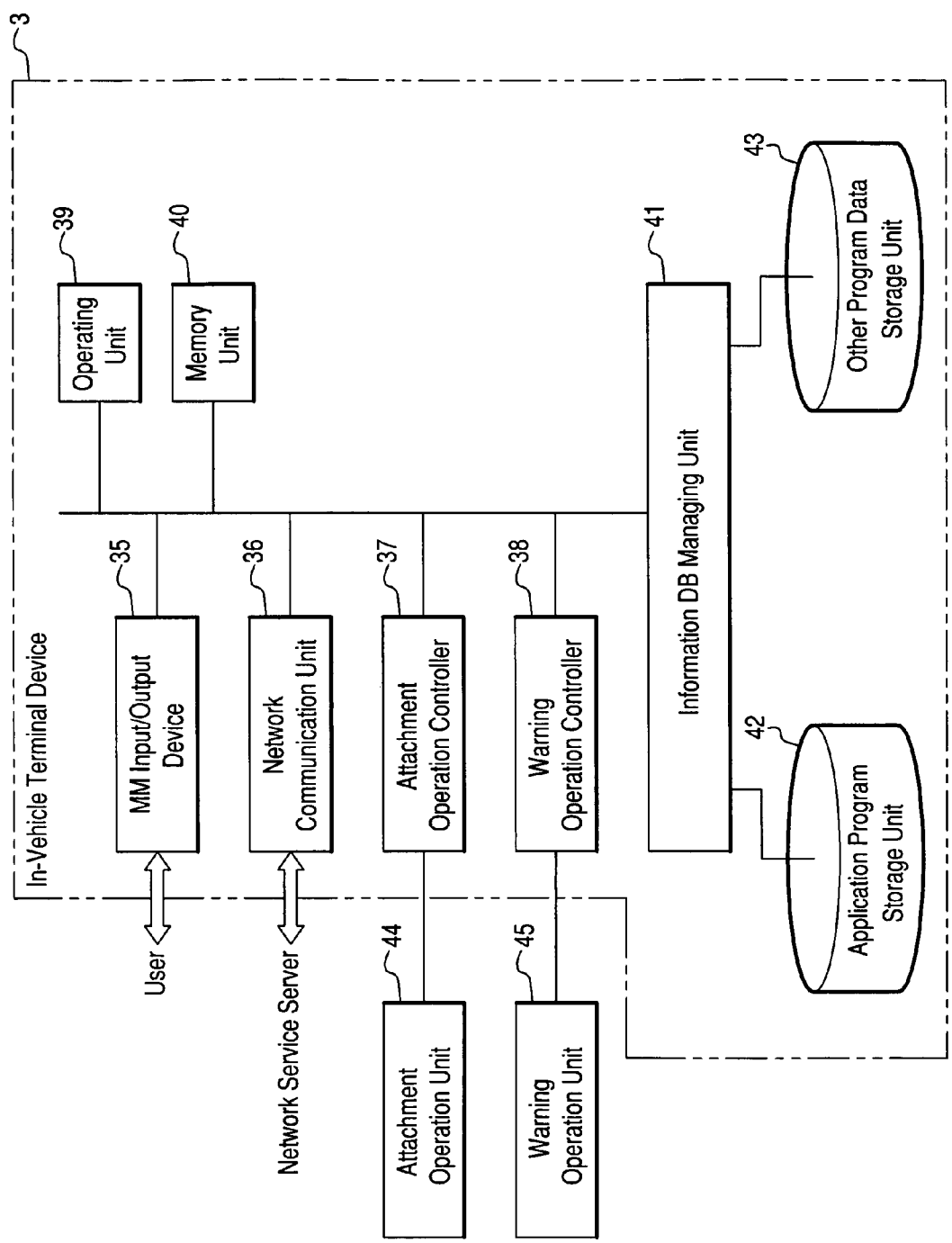
FIG. 8 is a block diagram showing the construction of an in-vehicle terminal device.

As shown in the block diagram of FIG. 8, the in-vehicle mount terminal device 3 comprises an MM input/output unit 35, a network communication unit 36, an attachment operation controller (action controller) 37, a warning controller (action controller) 38, an operating unit 39, a memory unit 40 and an information DB managing unit 41.

The MM input/output device 35 comprises a display unit such as a monitor or the like, and an input unit such as buttons, a pointing device, a touch panel, a voice input microphone, etc. The MM input/output unit 35 enables a user riding in a vehicle 1 to operate the in-vehicle terminal device 3.

The network communication unit 36 makes communications with the network service server 5, and function as a communication interface. The network communication unit 11 comprises a modem or terminal adaptor which is connected to a public telephone line of a cellular phone or a LAN interface when it is connected to a communication network through LAN.

The attachment operation controller 37 controls the attachment operation which is provided for a user by an attachment operation unit 44 provided to the vehicle 1. The warning controller 38 controls the warning which is issued to be a suspicious person by a warning unit 45 provided to the vehicle 1. Here, a horn, lights, turn indicators, various kinds of movable portions, etc. may be used as the attachment operation unit 44 and the warning unit 45.

The operating unit 39 carries out an operation to perform various kinds of information processing in the in-vehicle terminal device 3, and it may comprise CPU, for example. The memory unit 40 functions as a work memory when the operation of the operating unit 39 is carried out.

The information DB managing unit 41 functions as a data storage unit in the in-vehicle terminal device 3, and it comprises a rewritable recording medium such as a hard disk device or a reading medium reading device such as a DVD drive or the like. The information DB managing unit 41 is divided into an application program storage unit 42, and other program data storage unit 43. The application program storage unit 18 is a block for storing application programs to implement the various kinds of information processing in the in-vehicle terminal device 3. The other program data storage unit 43 is a block for storing an OS program of the in-vehicle terminal device 3, various kinds of programs which are not relevant to the security system, for example, car navigation software or AV (Audio & Visual)-related software, and other kinds of data such as map data, etc.

Next, the details of the processing in the network service server 5 will be described. First, the processing of the network service server 5 when any one of a suspicious person, an acquaintance and a user intrudes into a residential property 2 will be briefly described with reference to the flowchart of FIG. 9.

In step 1 (hereinafter referred to as "S1"), it is first determined whether an input of intrusion detection information is received from the intrusion detection device 6. Here, if it is determined that no input of the intrusion detection information is received (NO in S1), it is determined that the present state is under a state where no intruder exists in the residential property 2. The other processing in S2 is carried out, and then the judgment processing of S1 is carried out again. That is, the processing of S1 and S2 represents processing carried out in the network service server 5 until intrusion is detected.

On the other hand, if it is determined that an input of intrusion detection information is received (YES in S1), intruder identification processing in S3 is carried out. In the intruder identification processing, it is identified whether the intruder is a user, an acquaintance or a suspicious person. The detailed processing of S3 will be described later.

Subsequently, in S4, it is determined whether the intruder is determined as a user through the intruder identification processing of S3. Here, if it is determined that the intruder is a user (NO in S4), user recognition processing in S8 is carried out. The details of the user recognition processing will be described later.

Subsequently, in S5 it is determined whether the intruder is determined as an acquaintance through the intruder identification processing of S3. Here, if the intruder is determined as an acquaintance (NO in S5), acquaintance recognition processing of S7 is carried out. The details of the acquaintance recognition processing will be described later.

If YES is determined in S4 and S5, that is, it is determined that the intruder is neither user nor acquaintance, the intruder may be determined as a suspicious person. Therefore, suspicious-person recognition processing of S6 is carried out. The details of the suspicious-person recognition processing will be described later.

When the processing of S6, S7 and S8 is finished, the processing in the network service server 5 is finished. The above series of processing steps is repeated from S1 again immediately after the above processing is finished.

Figure 9:
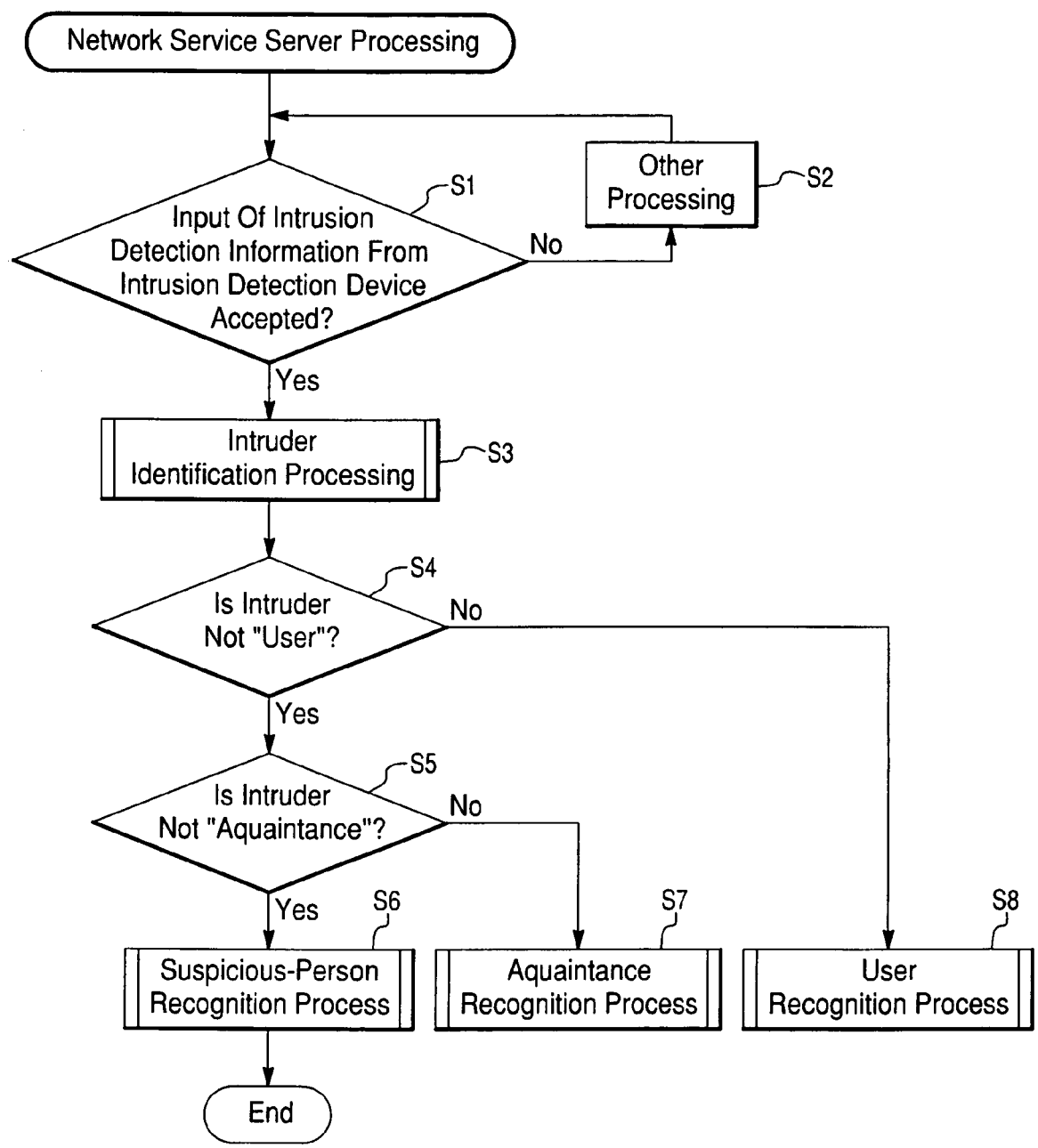
FIG. 9 is a flowchart showing the processing of the network service server when any one of a suspicious person, an acquaintance and a user enters into a predetermined area such as defined within the property line of the users residence.
Figure 10:
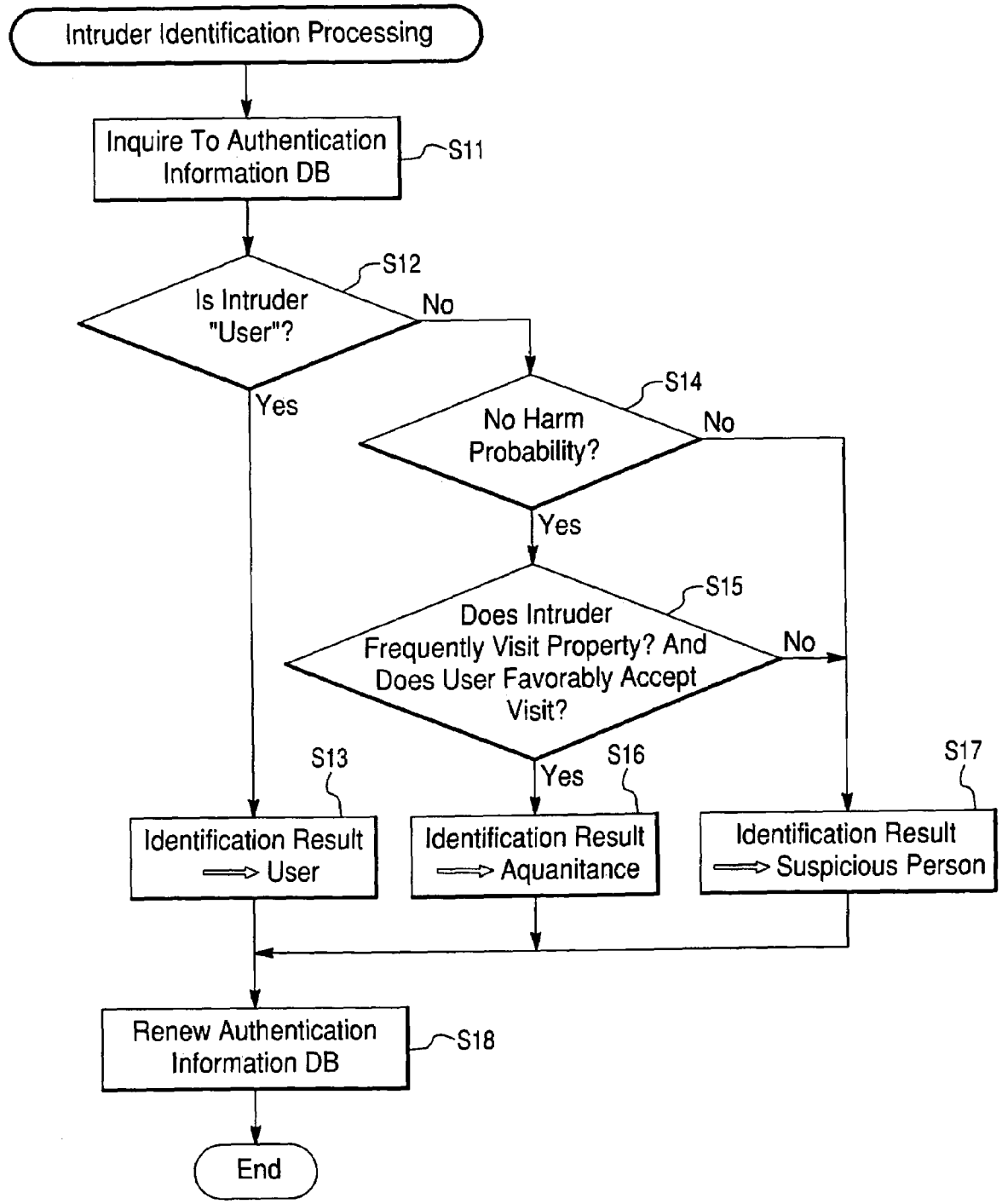
FIG. 10 is a flowchart showing the flow of intruder identifying process.

Next, the flow of the processing of S3, that is, the flow of the intruder identification processing in the flowchart of FIG. 9 will be described hereunder with reference to the flowchart of FIG. 10. First, in S11, information derived with respect to an intruder is collated with the authentication information DB stored in the information DB managing unit 17. The identification of the intruder may be carried out using a facial feature authentication system, an ID authentication system or the like.

According to the facial authentication system, an image pickup device for picking up images of an intruder is provided, pickup images of the intruder are achieved from the image pickup device and the intruder is specified on the basis of the image information concerning the intruder's face. When this system is used, facial information concerning users and acquaintances is registered in the authentication information DB in advance.

According to the ID authentication system, users and acquaintances are made to possess portable IC cards each having an ID authentication function, and a device for reading information from these portable IC cards is provided so that an intruder can be specified on the basis of the information thus read from each IC card. Here, a card reader may be used as the device for reading information from each portable IC card. However, when a near-distance wireless communication function is provided to each portable IC card, the identification of the intruder can be implemented by a communication device. Furthermore, a portable IC card may be installed in a cellular phone.

By inquiring to the authentication information DB in S11, it is first determined whether the intruder is a user or not (S12). Here, if it is determined that the intruder is a user (YES in S12), an identification result indicating that the intruder is a user is output (S13).

On the other hand, if the intruder is not a user (NO in S12), it is determined in S14 whether there is a probability that the intruder may cause harm. The judgment that there is a probability that the intruder causes harm may be made on the basis of a judgment as to whether information concerning the intruder exists in the authentication information DB, for example. That is, since the authentication information DB is renewed at all times as described later, the above judgment can be performed by registering information concerning persons who may visit the residential property 2 in the future or past visited the residential property 2. Here, when it is determined that there is a probability that the intruder causes harm (NO in S14), an identification result indicating that the intruder is a suspicious person is output (S17).

On the other hand, if it is determined that there is no probability that the intruder causes harm (YES in S14), it is determined in S15 whether the intruder frequently visits the residential property 2 and the user accepts his/her visit favorably. This judgment may be implemented as follow. For example, when some person visits the residential property 2 and the user registers information concerning the person concerned into the authentication information DB, the user simultaneously registers in the authentication information DB information as to whether the person is an acquaintance or not. Here, if it is determined that the intruder is a person whose visit is not favorably accepted by the user (NO in S15), an identification result indicating that the intruder is a suspicious person is output (S17).

On the other hand, if it is determined that the intruder is a person whose visit is favorably accepted by the user (YES in S15), an identification result indicating that the intruder is an acquaintance is output (S16).

When the processing of S13, S16 and S17 described above is completed, the authentication information DB is renewed on the basis of the identification result of S18, and the intruder identification processing is finished.

Figure 11:
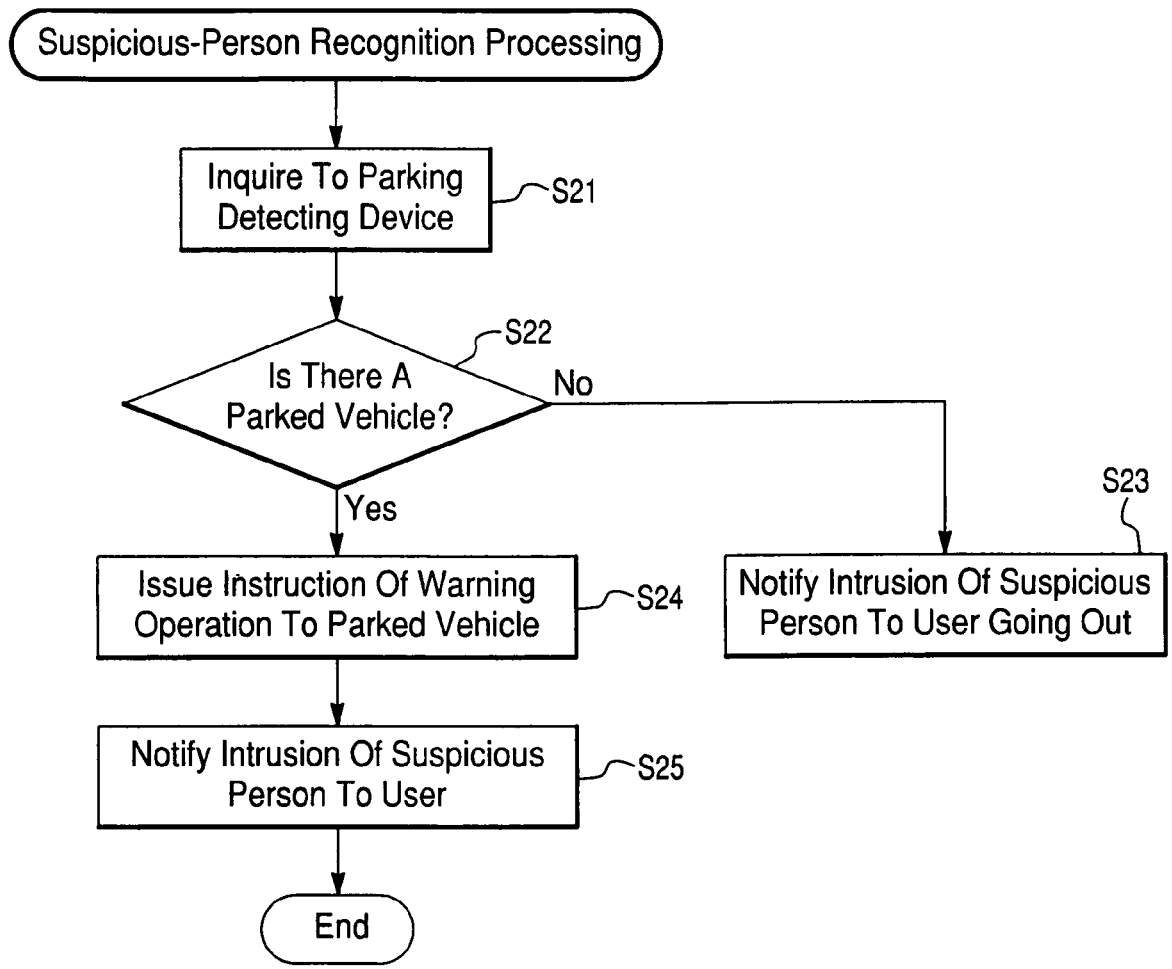
FIG. 11 is a flowchart showing the flow of processing carried out when an intruder is a suspicious-person (hereinafter referred to as "suspicious-person recognition processing")

Next, the processing of S6 in the flowchart of FIG. 9, that is, the flow of suspicious-person recognition processing will be described hereunder with reference to the flowchart of FIG. 11.

First, an inquiry is made to the parking detection device 7 (S21). In S22, it is judge whether there is any vehicle 1 under parking. Here, if it is determined that there is no parked vehicle 1 (NO in S22), intrusion of a suspicious person is provided to the user who goes out (S23). This notification may be made to the in-vehicle terminal device 3 of the vehicle 1 in which the user concerned rides or to a cellular phone owned by the user concerned.

On the other hand, if it is determined that there is a parked vehicle 1 (YES in S22), in S24, an instruction for the warning is issued to the parked vehicle 1. This instruction is transmitted from the network service server 5 to the in-vehicle terminal device 3 through a private network such as Bluetooth (registered trademark), a wireless LAN or the like. Thereafter, when there is any user in the residential property 2, intrusion of a suspicious person is provided to the user concerned (S25). Through the above processing, the suspicious-person recognition processing is finished.

Figure 23B:
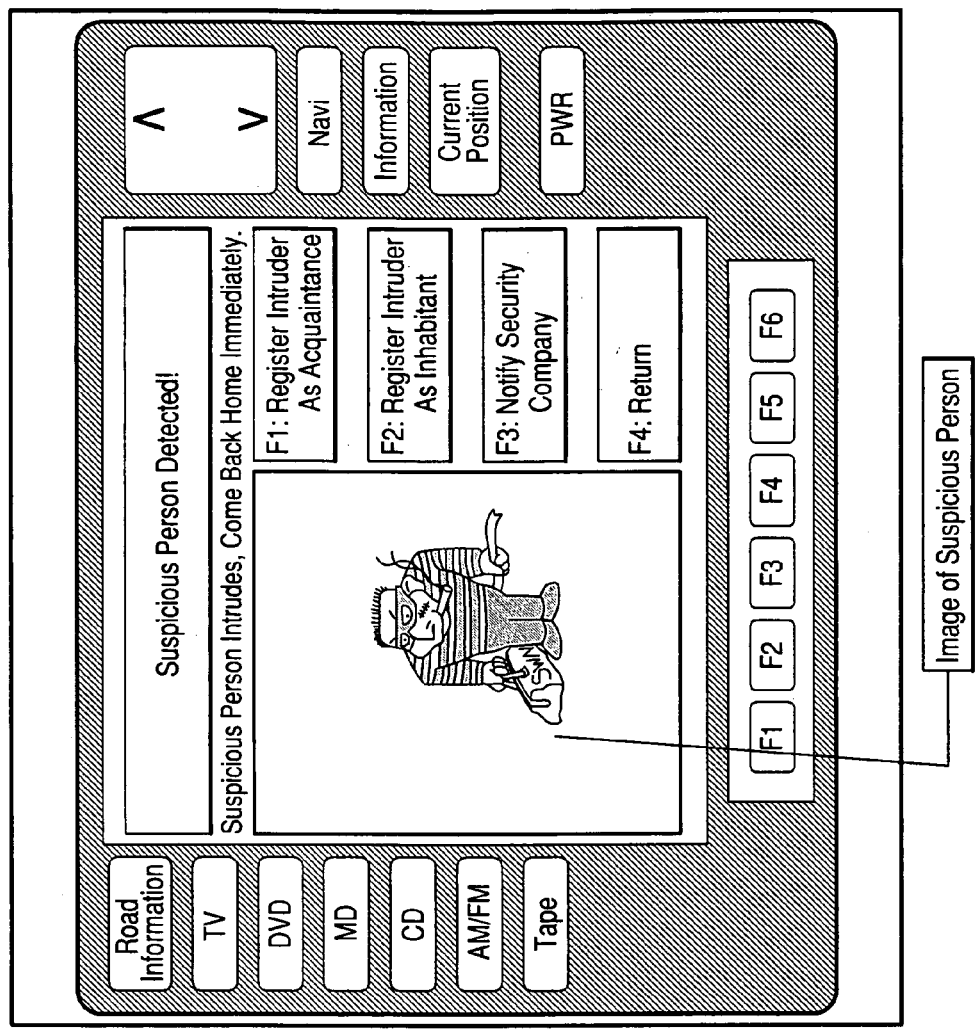
FIG. 23B shows a display example on a display screen of the in-vehicle terminal device in that case.
Figure 23A:
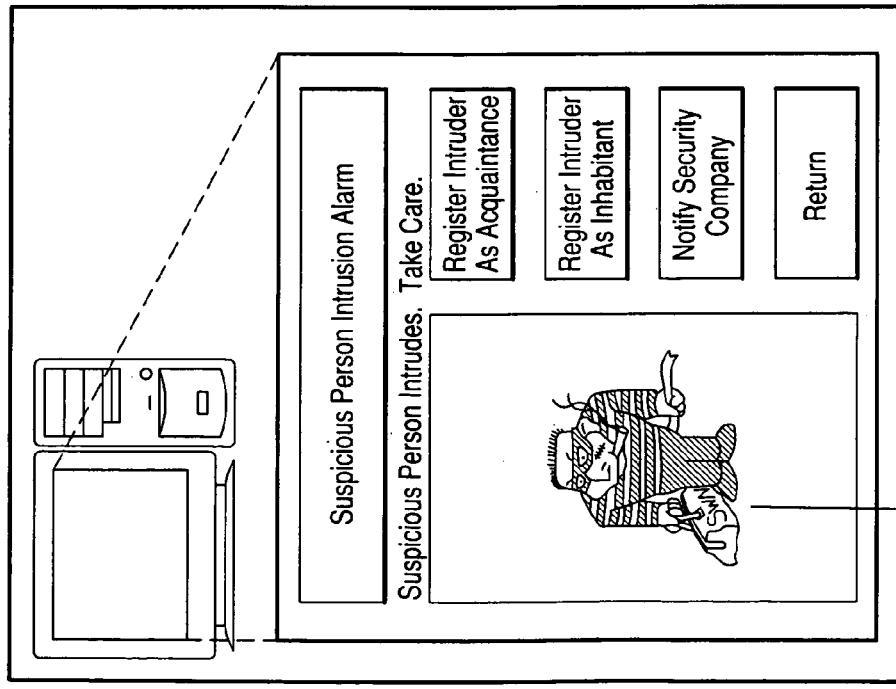
FIG. 23A shows a display example on a display screen in the network service server when intrusion of a suspicious person is detected.

FIG. 23A shows a display example on a display screen of the network service server 5 when intrusion of a suspicious person is detected, and FIG. 23B shows a display example on a display screen of the in-vehicle terminal device 3. The display screen of the in-vehicle terminal device 3 corresponds to a display of a car navigation system. As shown in FIGS. 23A and 23B, when the intrusion of the suspicious person is detected, an image of the suspicious person concerned may be displayed, and also the suspicious person may be registered as an acquaintance or inhabitant (user) in the authentication information DB, informed to a security company or the like. With respect to the display in the in-vehicle terminal device 3, a message from the vehicle 1 is preferably represented as if it has a personality. Accordingly, the user is made to promote his/her attachment to the vehicle 1.

Figure 12:
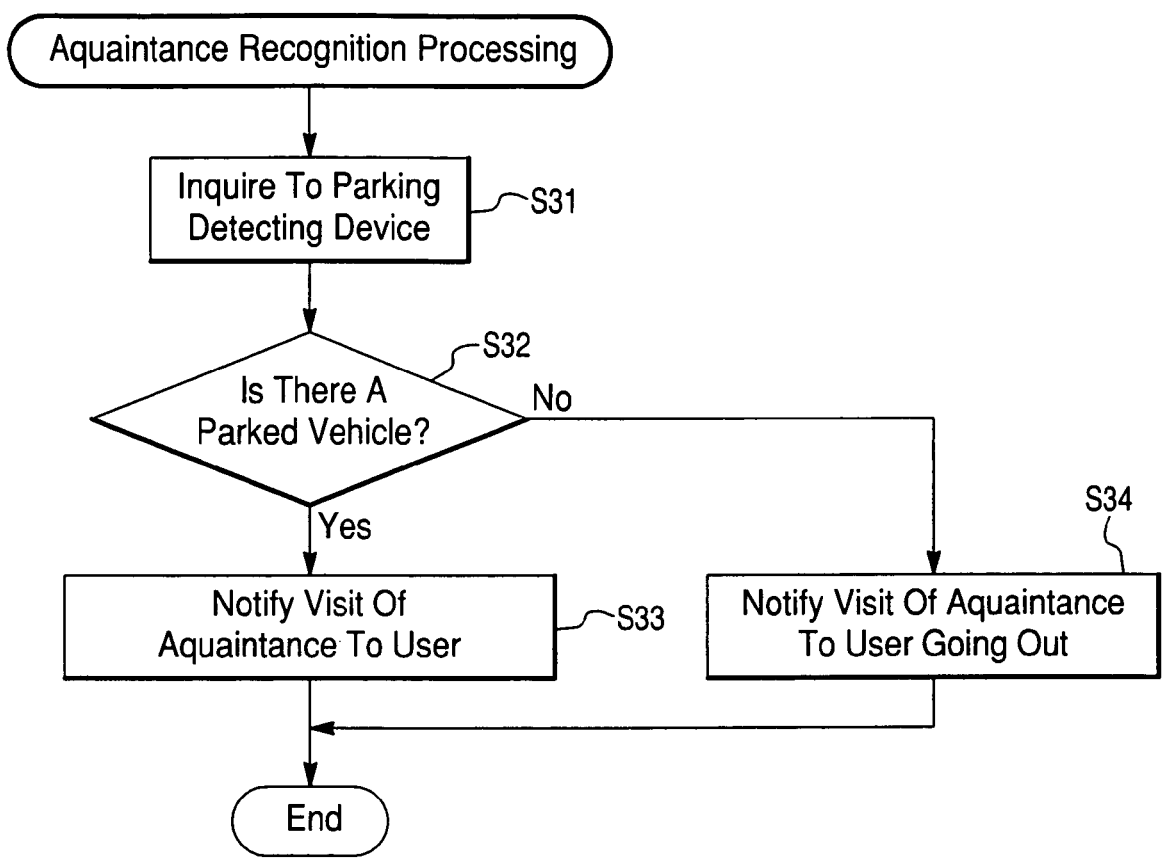
FIG. 12 is a flowchart showing the flow of processing to be carried out when an intruder is an acquaintance (hereinafter referred to as "acquaintance recognition processing")

Next, the processing of S7 in the flowchart of FIG. 9, that is, the flow of acquaintance recognition processing will be described hereunder with reference to the flowchart of FIG. 12.

First, an inquiry is made to the parking detection device 7 (S31). In S32, it is determined whether there is a parked vehicle 1. Here, if it is determined that there is no parked vehicle 1 (NO in S32), it is provided to the user going out that an acquaintance visits (S34). This notification may be made to the in-vehicle terminal device 3 of the vehicle 1 in which the user concerned rides or a cellular phone owned by the user concerned.

On the other hand, if it is determined that there is a parked vehicle 1 (YES in S32), when there is a user in the residential property 2, intrusion of the suspicious person is provided to the user concerned in S33. Through the above processing, the acquaintance recognition processing is finished.

In the above processing, the user is determined to go out when there is no parked vehicle 1, and also the user is determined to be in the residential property 2 when there is a parked vehicle 1. However, other cases may be considered, and thus both the processing of S33 and the processing of S34 may be carried out irrespective of the presence or absence of the parked vehicle 1.

Figure 24B:
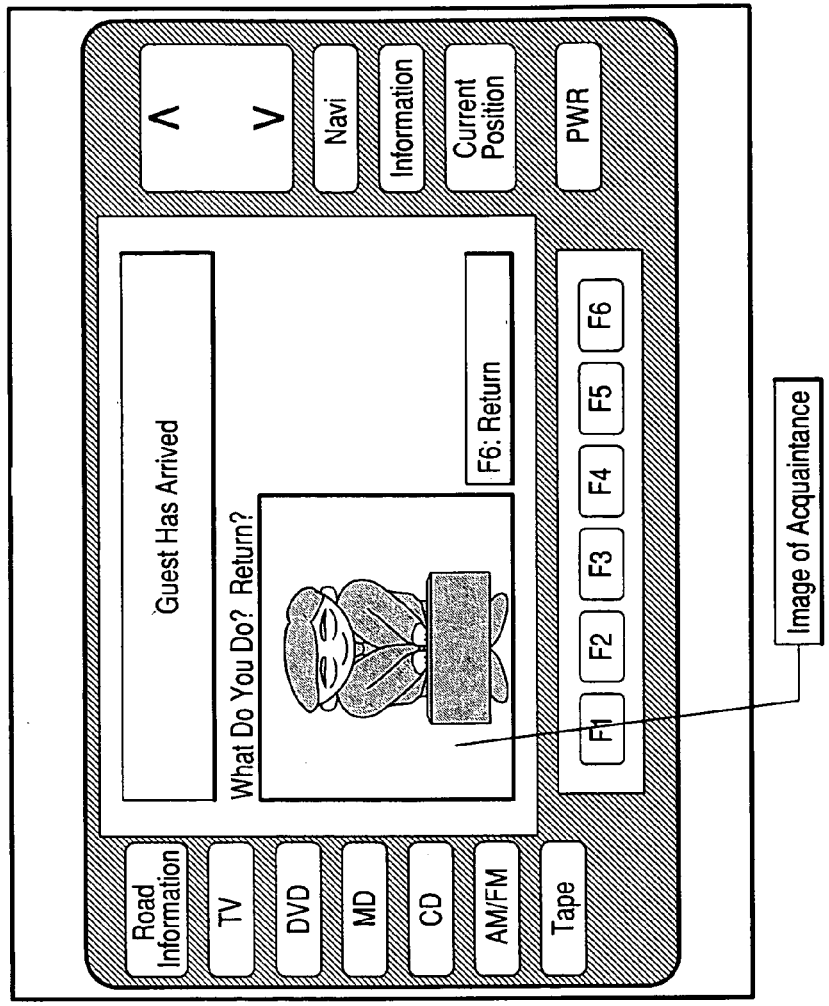
FIG. 24B shows a display example on the display screen in the in-vehicle terminal device in such a case.
Figure 24A:
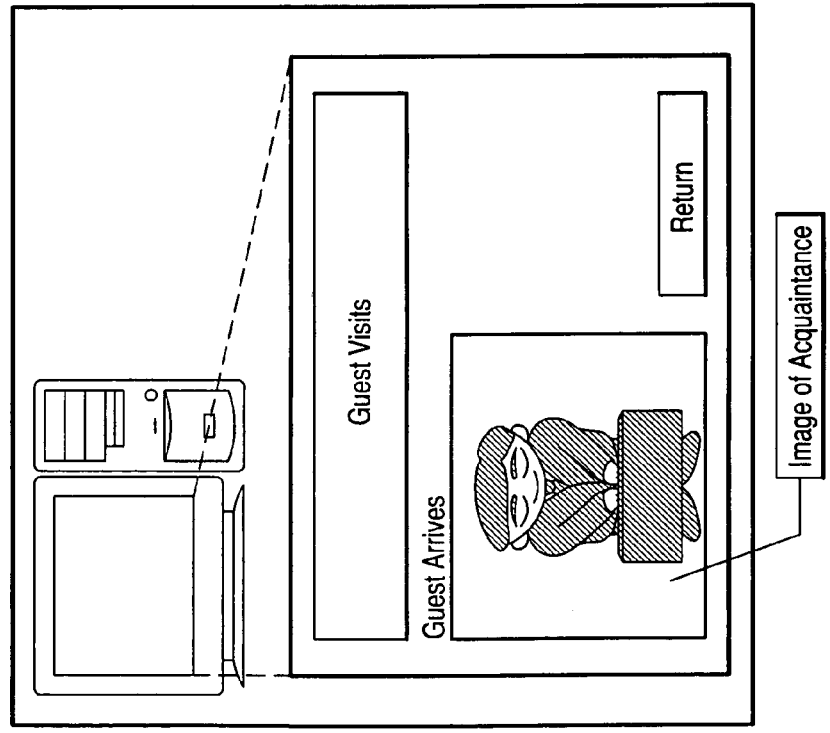
FIG. 24A shows a display example on the display screen in the network service server when a visit by an acquaintance is detected.

FIG. 24A shows a display example on the display screen of the network service server 5 when visit of an acquaintance is detected, and FIG. 24B shows a display example on the display screen of the in-vehicle terminal device 3 when visit of an acquaintance is detected. The display screen of the in-vehicle terminal device 3 corresponds to the display of the car navigation system. As shown in FIGS. 24A and 24B, when visit of an acquaintance is detected, an image of the acquaintance concerned is displayed. Furthermore, with respect to the display on the in-vehicle terminal device 3, a message from the vehicle 1 is represented as if it has a personality, whereby the user is made to promote his/her attachment to the vehicle 1.

Figure 13:
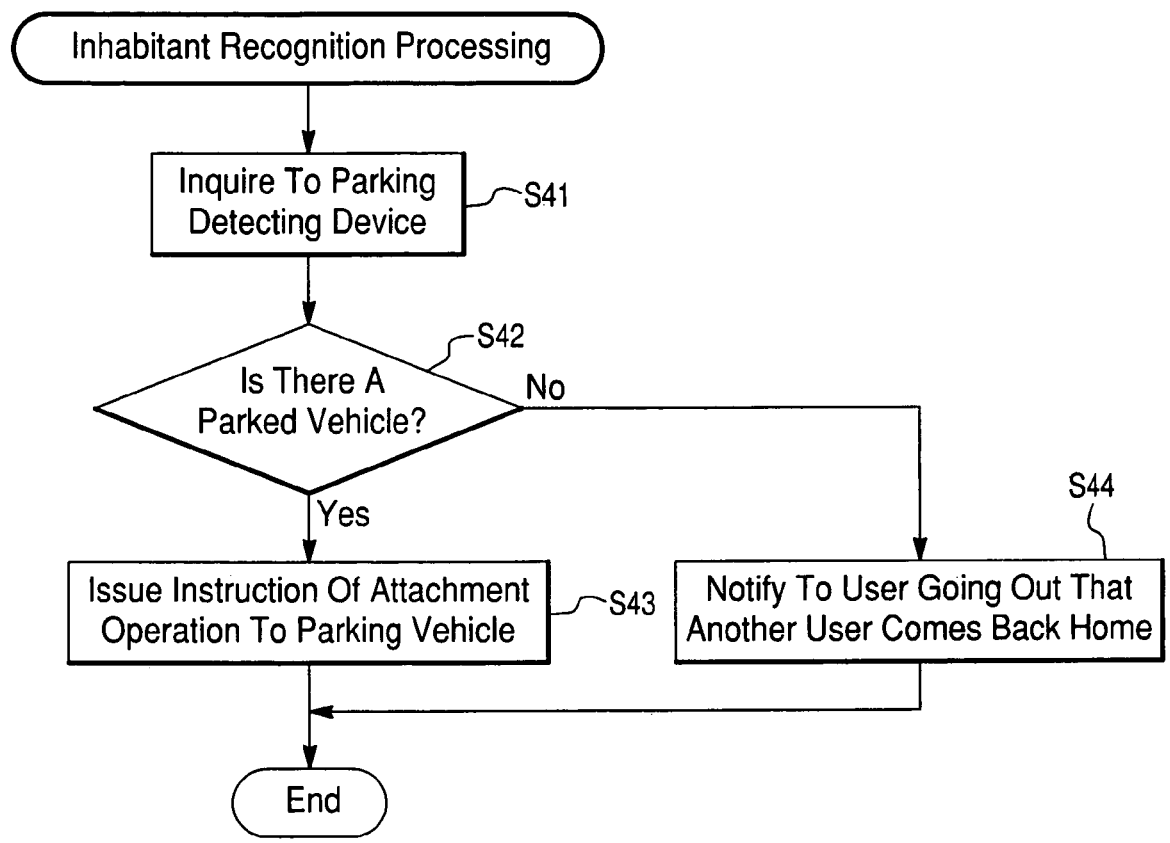
FIG. 13 is a flowchart showing the flow of processing to be carried out when an intruder is a user (hereinafter referred to as "user recognition processing")

Next, the processing of S8 of the flowchart of FIG. 9, that is, the flow of user recognition processing will be described hereunder with reference to the flowchart of FIG. 13.

First, an inquiry is made to the parking detection device 7 (S41). In S42, it is determined whether there is a parked vehicle 1. Here, if it is determined that there is no parked vehicle 1 (NO in S42), it is provided to a user going out that another user comes back home (S44). This notification may be made to the in-vehicle terminal device 3 of the vehicle 1 in which the user going out rides or a cellular phone owned by the user concerned.

On the other hand, if it is determined that there is a parked vehicle 1 (YES in S42), an instruction for an attachment operation is issued to the parked vehicle in S43. This instruction is communicated from the network service server 5 to the in-vehicle terminal device 3 through a private network such as Bluetooth (registered trademark), a wireless LAN or the like. Thereafter, when the user is in the residential property 2, it may be provided to the user concerned that another user comes back home. Through the above processing, the user recognition processing is finished.

Figure 25:
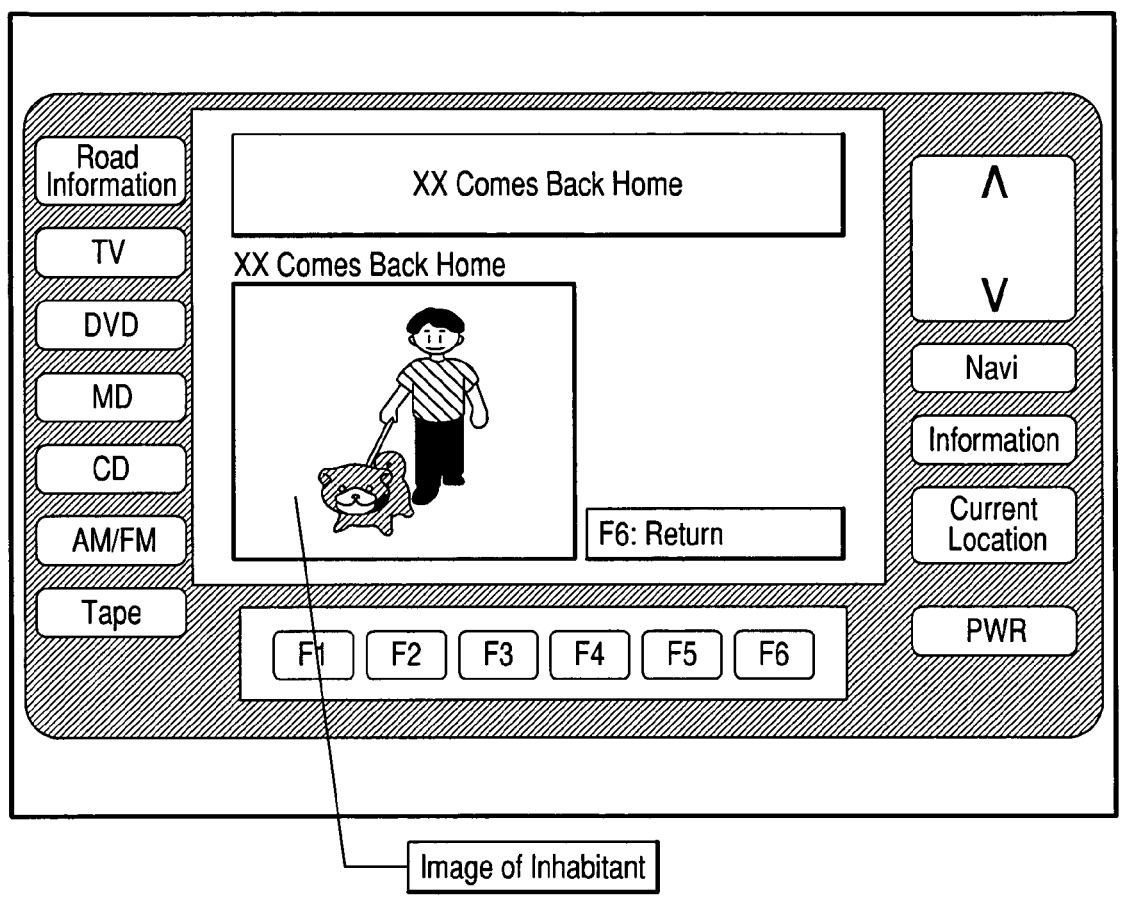
FIG. 25 is a diagram showing a display example on the display screen of the in-vehicle terminal device when user's homecoming is detected.

FIG. 25 shows a display example on the display screen of the in-vehicle terminal device 3 when it is detected that a user (inhabitant) comes back home. The display screen of the in-vehicle terminal device 3 corresponds to the display of the car navigation system. As shown in FIG. 25, when it is detected that a user comes back home, an image of the user is displayed. With respect to the display on the in-vehicle terminal device 3, a message from the vehicle 1 is preferably represented as if it has a personality, whereby the user is made to promote his/her attachment to the vehicle 1.

Next, the processing in the in-vehicle terminal device 3 will be described.

The processing when instructions to carry out the attachment operation and the warning are received from the network service server 5 under the state where the vehicle 1 is parked in the parking area 8 will be described with reference to the flowcharts of FIGS. 14A and 14B.

Figure 14A:
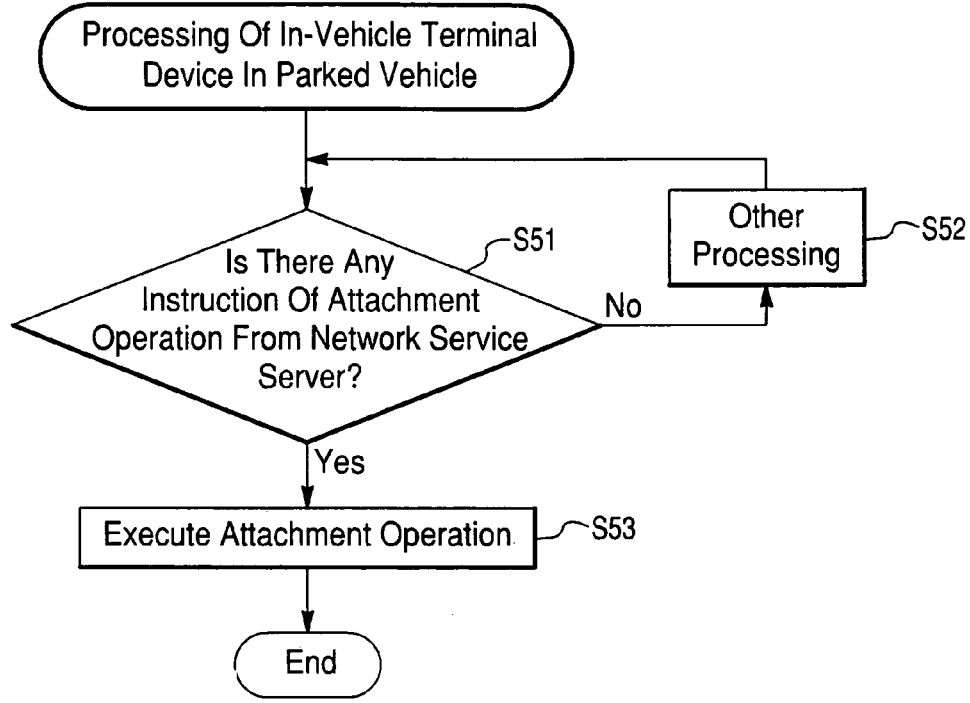
FIGS. 14A and 14B are flowcharts showing the flow of processing in the in-vehicle terminal device when instructions for taking an attachment operation and a warning are received from the network service server.

FIG. 14A shows the flow of the processing when the attachment operation instruction is received. First, in S51, it is determined whether there is an attachment operation instruction from the network service server 5. Here, if it is determined that no attachment operation instruction is received (NO in S51), the other processing in S52 is carried out, and also the judgment processing of S51 is carried out again. That is, the processing of S51 and S52 corresponds to the processing carried out in the in-vehicle terminal device 3 until the attachment operation instruction is received.

If it is determined in S51 that the attachment operation instruction is received, the attachment operation is executed in S53, and the processing is finished. Immediately after the processing is finished, the above processing is repeated from S51 again.

Figure 14B:
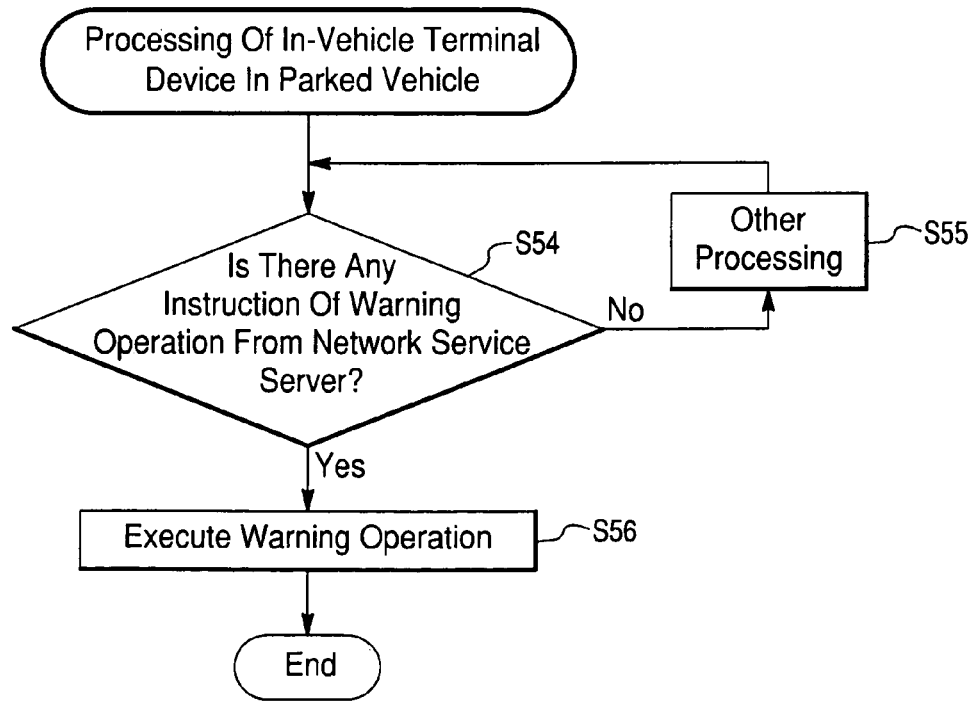

FIG. 14B shows the flow of the processing when the warning instruction is received. First, it is determined in S54 whether there is a warning instruction from the network service server 5. Here, if it is determined that no warning instruction is received (NO in S54), the other processing in S55 is carried out, and also the judgment processing of S54 is carried out again. That is, the processing of S54 and S55 corresponds to the processing in the in-vehicle terminal device 3 until the warning instruction is received.

If it is determined in S54 that the warning instruction is received, the warning is carried out in S56, and the processing is finished. Here, immediately after the processing is finished, the above processing is repeated from S54 again.

Next, the processing when the suspicious-person intrusion information and the acquaintance visit information are received from the network service server 5 under the state that the vehicle 1 is out of the parking area 8 will be described with reference to the flowcharts of FIGS. 15A and 15B.

Figure 15A:
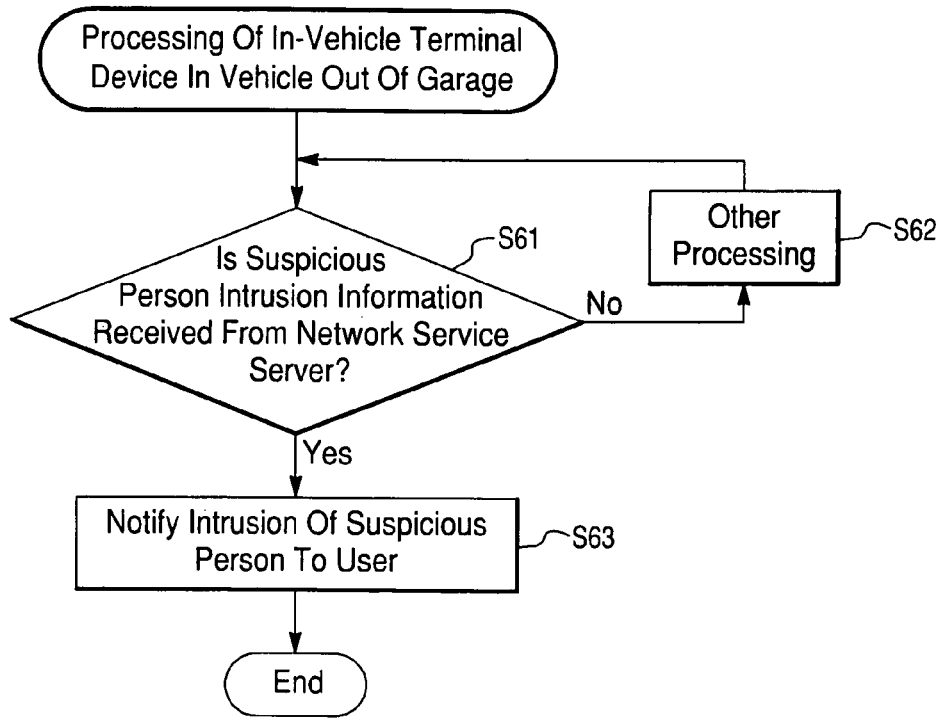
FIGS. 15A and 15B are flowcharts showing the flow of processing in the in-vehicle terminal device when suspicious-person intrusion information and acquaintance visit information are received from the network service server.

FIG. 15A shows the flow of the processing when the suspicious-person intrusion information is received. First, it is determined in S61 whether the suspicious-person intrusion information is received from the network service server 5. Here, if it is determined that no suspicious-person intrusion information is received (NO in S61), the other processing in S62 is carried out and also the judgment processing of S61 is carried out again. That is, the processing of S61 and S62 corresponds to the processing in the in-vehicle terminal device 3 until the suspicious-person intrusion information is received.

If it is determined in S61 that the suspicious-person intrusion information is received, the intrusion of the suspicious person into the residential property 2 is provided to the user riding in the vehicle in S63, and then the processing is finished. Immediately after the processing is finished, the above processing is repeated from S61 again.

Figure 15B:
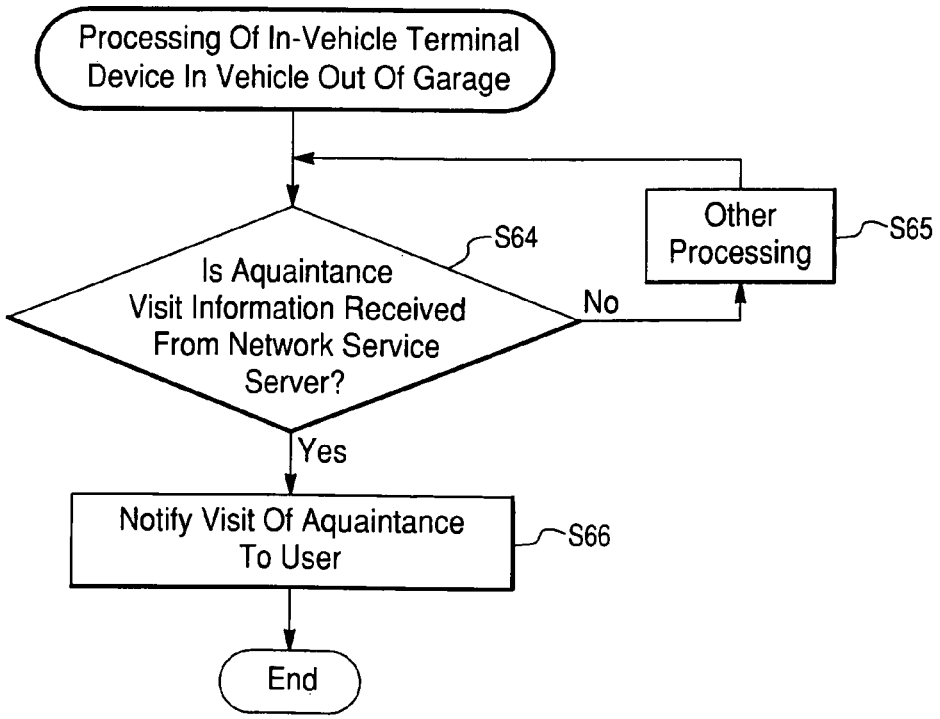

FIG. 15B shows the flow of the processing when the acquaintance visit information is received. First, it is determined in S64 whether the acquaintance visit information is received from the network service server 5. Here, if it is determined that no acquaintance visit information is received (NO in S64), the other processing in S65 is carried out, and the judgment processing of S64 is carried out again. That is, the processing of S64 and S65 corresponds to the processing carried out in the in-vehicle terminal device 3 until the acquaintance visit information is received.

If it is determined in S64 that the acquaintance visit information is received, the acquaintance's visit into the residential property 2 is provided to the user riding in the vehicle in S66, and then the processing is finished. Here, immediately after the processing is finished, the above processing is repeated from S64 again.

Figure 16:
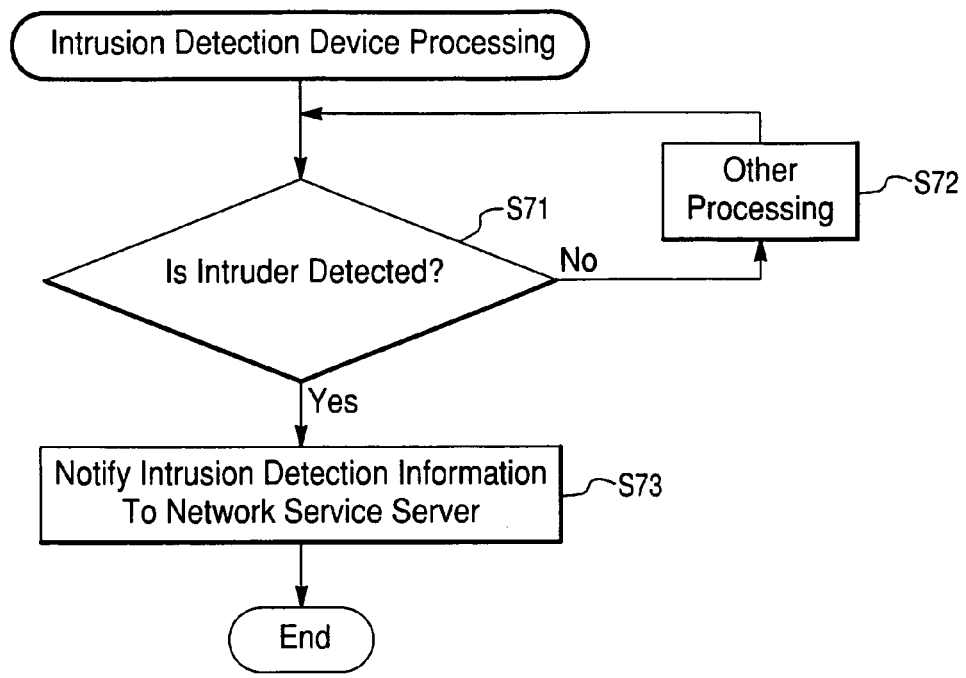
FIG. 16 is a flowchart showing the flow of processing in an intrusion detection device.

Next, the flow of the processing in the intrusion detection device 6 will be described with reference to the flowchart of FIG. 16. First, it is determined in S71 whether appearance of an intruder into the residential property 2 is detected or not. Here, it is determined that no intruder is detected (NO in S71), the other processing in S72 is carried out, and also the judgment processing of S71 is carried out. That is, the processing of S71 and S72 corresponds to the processing carried out in the intrusion detection device 6 until some intruder is detected.

If it is determined in S71 that some intruder is detected, intrusion detection information indicating that some person intrudes into the residential property 2 is provided to the network service server 5 in S73, and then the processing is finished. Immediately after the processing is finished, the above processing is repeated from S71 again.

Figure 17:
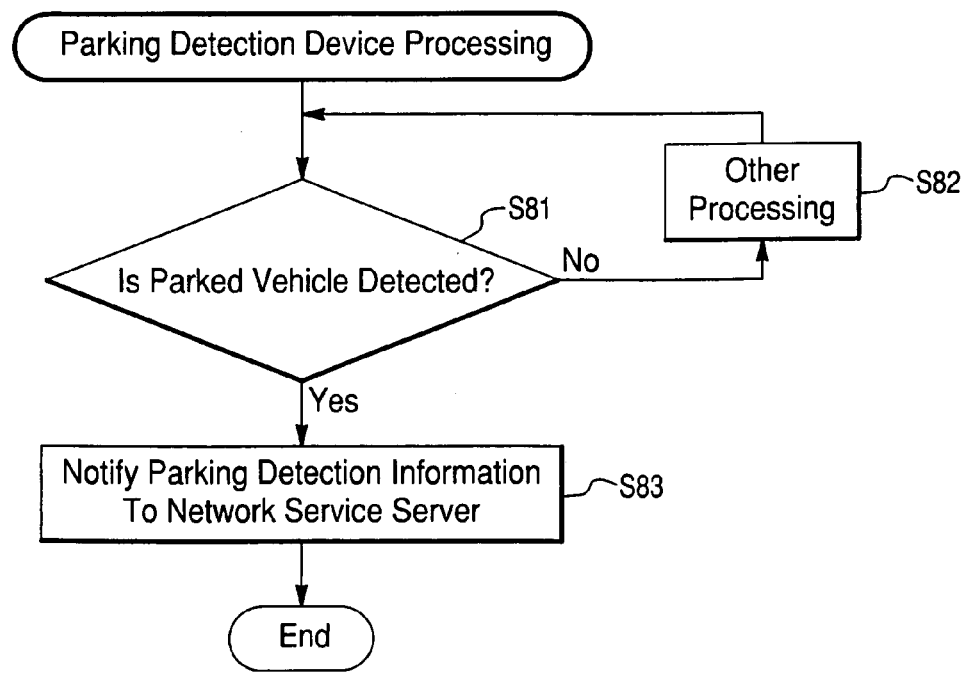
FIG. 17 is a flowchart showing the flow of processing in a parking detection device.

Next, the flow of the processing in the parking detection device 7 will be described with reference to the flowchart of FIG. 17. First, it is determined in S81 whether there is the parked vehicle 1 in the parking area 8. Here, if it is determined that no parked vehicle 1 is detected (NO in S81), the other processing in S82 is carried out, and the judgment of S81 is carried out again. That is, the processing of S81 and S82 corresponds to the processing carried out in the parking detection device 7 until the parked vehicle 1 is detected.

If it is determined in S81 that the parked vehicle 1 is detected, parking detection information indicating that the parked vehicle exists in the parking area 8 is provided to the network service server 5 in S83, and then the processing is finished. Here, immediately after the processing is finished, the above processing is repeated from S81 again.

Next, an embodiment shown in FIG. 4, that is, the flow of the processing when a message is transmitted/received between the network service server 5 and the in-vehicle terminal device 3 will be described. FIGS. 18A to 18D show the flow of the processing in the network service server 5.

First, the processing in the network service server 5 when a user A transmits status information from the network service server 5 to a user B riding in a vehicle 1 and then a reply is transmitted from the user B to the user A will be described with reference to FIGS. 18A and 18B.

Figure 18A:
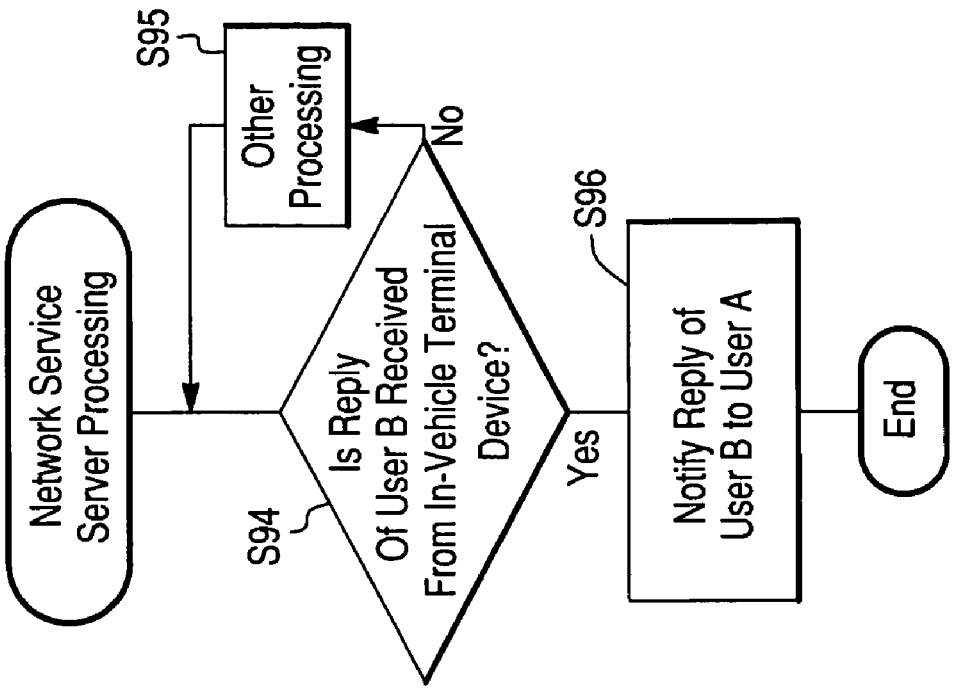
FIGS. 18A to 18D are flowcharts showing the flow of processing in the network service server when a message is received/transmitted between the network service server and the in-vehicle terminal device.
Figure 18B:
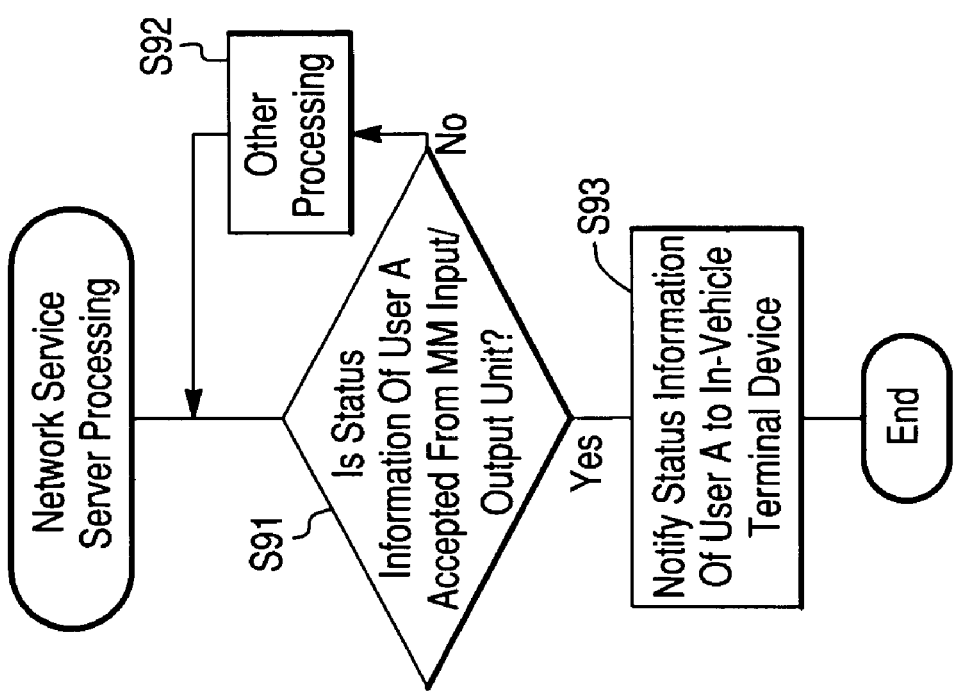

First, in S91 of FIG. 18A, it is determined whether an input of status information from the user A to the user B is accepted by the MM input/output unit 12 of the network service server 5. Here, if it is determined that the input of the status information is not accepted (NO in S91), the other processing in S92 is carried out, and the judgment processing of S91 is carried out again. That is, the processing of S91 and S92 corresponds to the processing carried out in the network service server 5 until the input of the status information is accepted.

If it is determined in S91 that the input of the status information is accepted, the status information from the user A is provided to the in-vehicle terminal device 3 in S93, and then the processing is finished. Here, immediately after the processing is finished, the above processing is repeated from S91 again.

Subsequently, it is determined in S94 of FIG. 18B whether a reply from the user B is received from the in-vehicle terminal device 3. Here, if it is determined that the reply from the user B is not received (NO in S94), the other processing in S95 is carried out, and the judgment processing of S94 is carried out again. That is, the processing of S94 and S95 corresponds to the processing carried out in the network service server 5 until the reply of the user B is received.

If it is determined in S94 that the reply of the user B is received, the reply from the user B is provided to the user A in S96, and then the processing is finished. Here, immediately after the processing is finished, the above processing is repeated from S94 again.

Subsequently, the processing in the network service server 5 when the user B riding in the vehicle 1 transmits status information from the in-vehicle terminal device 3 to the user A in the residential property 2, and then the user A transmits a reply to the user B will be described with reference to FIGS. 18C and 18D.

Figure 18D:
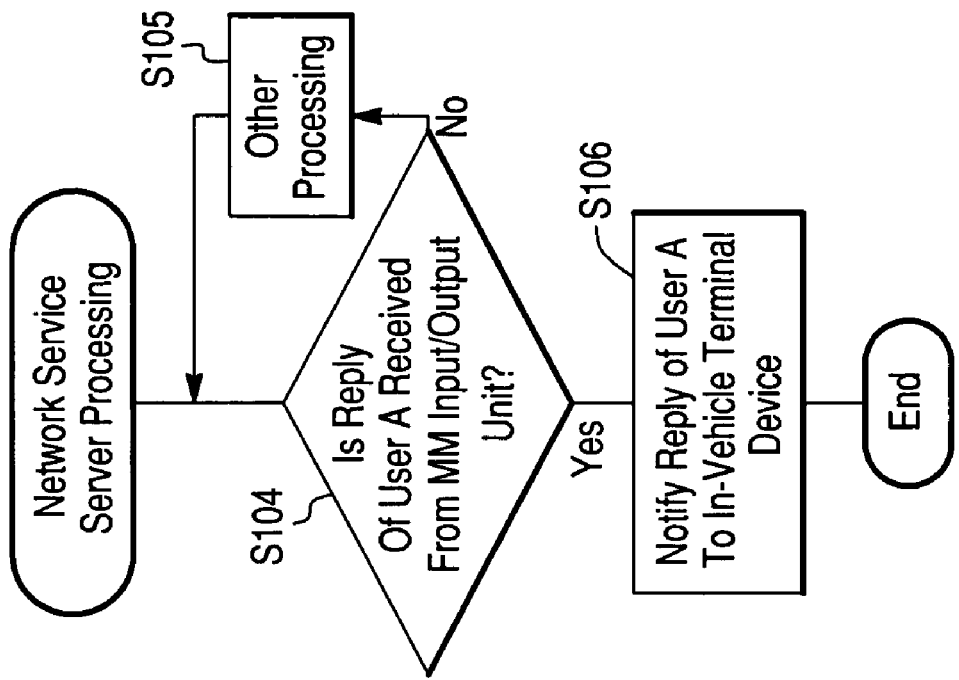
Figure 18C:
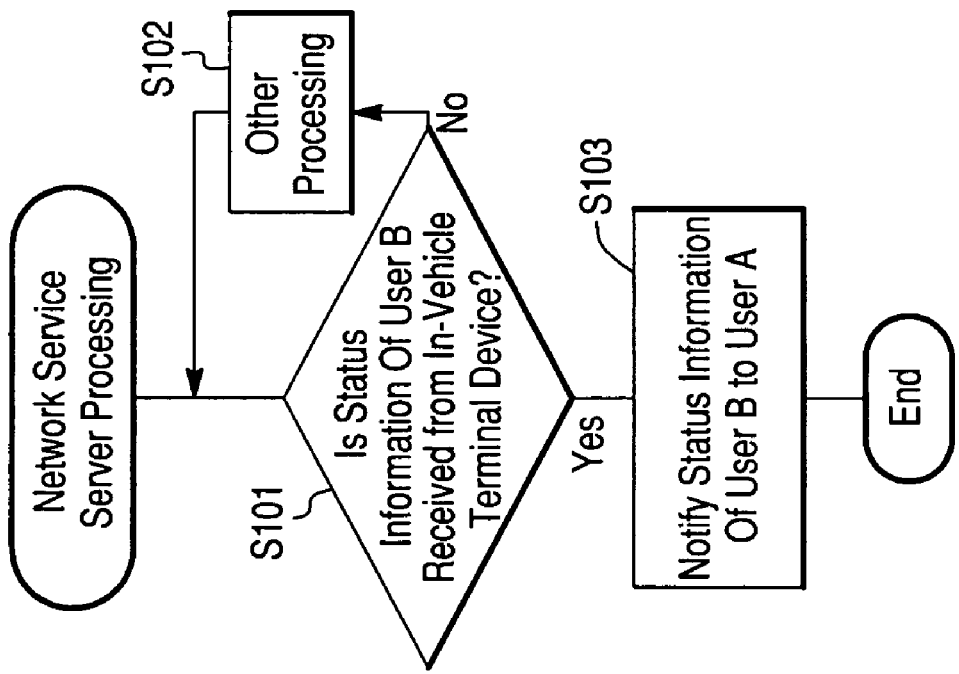

First, it is determined in S101 of FIG. 18C whether status information from the user B to the user A is received from the in-vehicle terminal device 3. Here, if it is determined that the status information from the user B is not received (NO in S101), the other processing in S102 is carried out, and the judgment processing of S101 is carried out. That is, the processing of S101 and S102 corresponds to the processing carried out in the network service server 5 until the status information from the user B is received.

If it is determined in S101 that the status information from the user B is received, the status information from the user B is provided to the user A in S103, and the processing is finished. Immediately after the processing is finished, the above processing is repeated from S101.

Next, it is determined in S104 of FIG. 18D whether an input of the replay from the user A to the user B is accepted by the MM input/output unit 12 of the network service server 5. Here, if it is determined that the input of the reply from the user A is not accepted (NO in S104), the other processing in S105 is carried out, and the judgment processing of S104 is carried out again. That is, the processing of F104 and S105 corresponds to the processing carried out in the network service server 5 until the input of the status information is accepted.

If it is determined in S104 that the input of the reply from the user A is accepted, the reply of the user A is provided to the in-vehicle terminal device 3 in S106, and the processing is finished. Immediately after the processing is finished, the above processing is repeated from S104 again.

Next, the flow of the processing in the in-vehicle terminal device 3 when a message is transmitted/received between the network service server 5 and the in-vehicle terminal device 3 will be described with reference to FIGS. 19A to 19D.

First, the processing in the in-vehicle terminal device 3 when the user A transmits status information from the network service server 5 to the user B riding in the vehicle 1 and then the user B transmits a reply to the user A will be described with reference to FIGS. 19A and 19B.

Figure 19A:
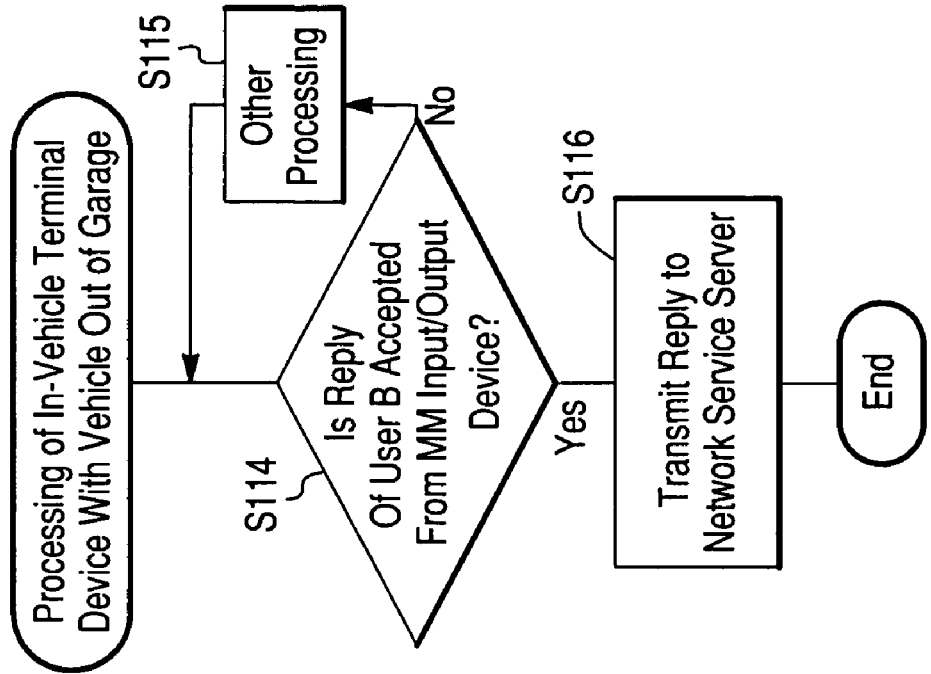
FIGS. 19A to 19D are flowcharts showing the flow of processing in the in-vehicle terminal device when a message is received/transmitted between the network service server and the in-vehicle terminal device.
Figure 19B:
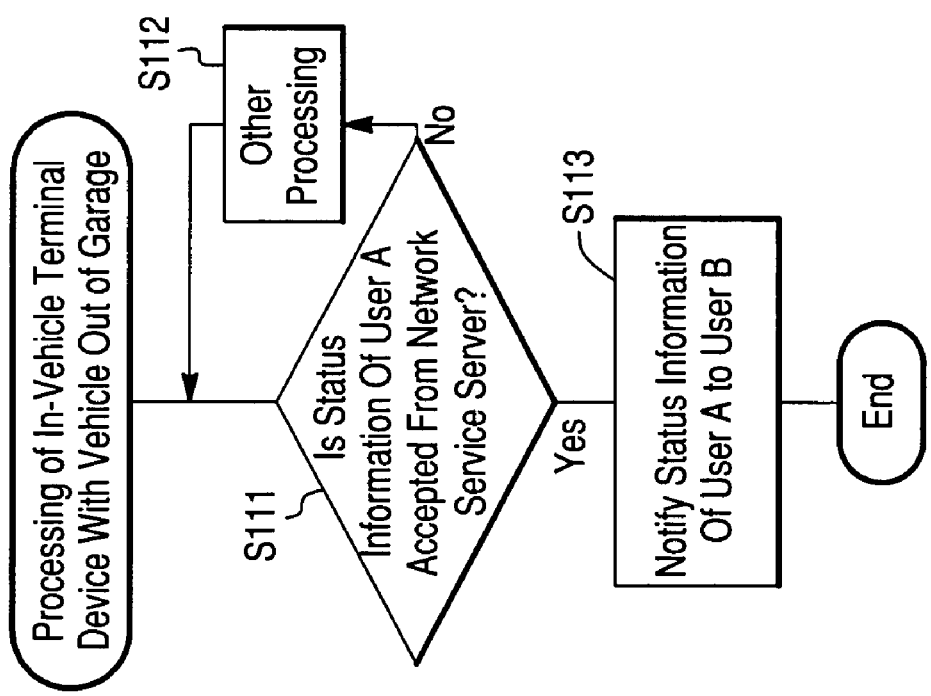

First, it is determined in S11 of FIG. 19A whether the status information from the user A to the user B is received from the network service server 5. Here, if it is determined that no status information is received (NO in S111), the other processing in S112 is carried out, and also the judgment processing of S111 is carried out. That is, the processing of S111 and S112 corresponds to the processing carried out in the in-vehicle terminal device 3 until status information is received.

If it is determined in S111 that the status information is received, the status information from the user A is provided to the user B in S113, and then the processing is finished. Here, immediately after the processing is finished, the above processing is repeated from S111 again.

Subsequently, it is judge in S114 of FIG. 19B whether a reply of the user B to the status information thus received is accepted in the MM input/output device 35 of the in-vehicle terminal device 3. When it is determined that the reply of the user B is not accepted (NO in S114), the other processing in S115 is carried out, and the judgment processing of S114 is carried out. That is, the processing of S114 and S115 corresponds to the processing carried out in the in-vehicle terminal device 3 until the reply of the user B is accepted.

If it is determined in S114 that the reply of the user B is accepted, the replay from the user B to the user A is provided to the network service server 5 in S116, and then the processing is finished. Immediately after the processing is finished, the above processing is repeated from S114 again.

Figure 19D:
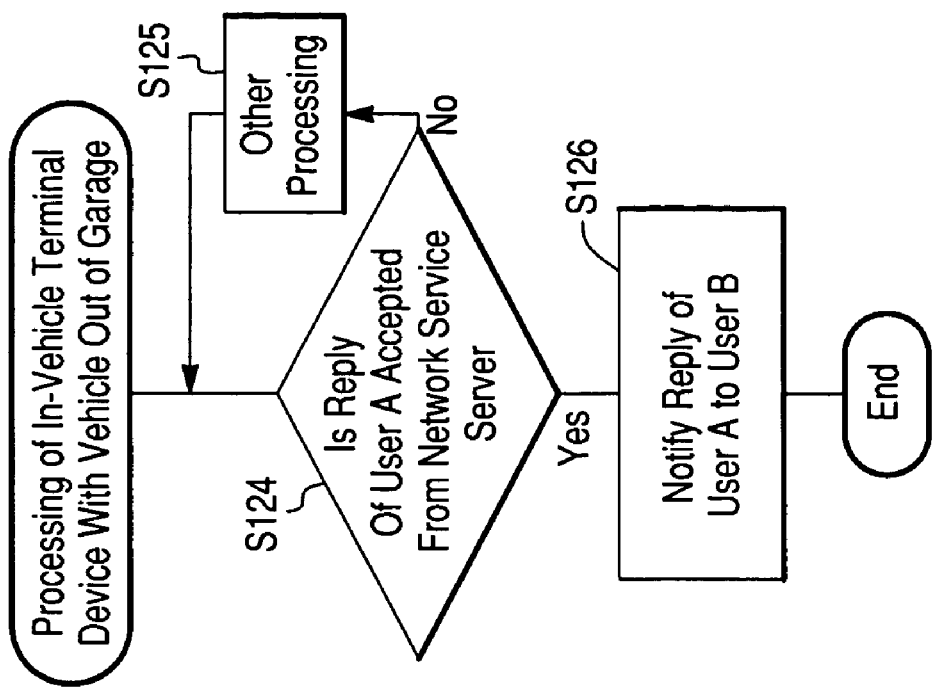

Next, the processing in the in-vehicle terminal device 3 when the user B riding in the vehicle 1 transmits status information from the in-vehicle terminal device 3 to the user A in the residential property 2, and then a reply is transmitted from the user A to the user B will be described with reference to FIGS. 19C and 19D.

Figure 19C:
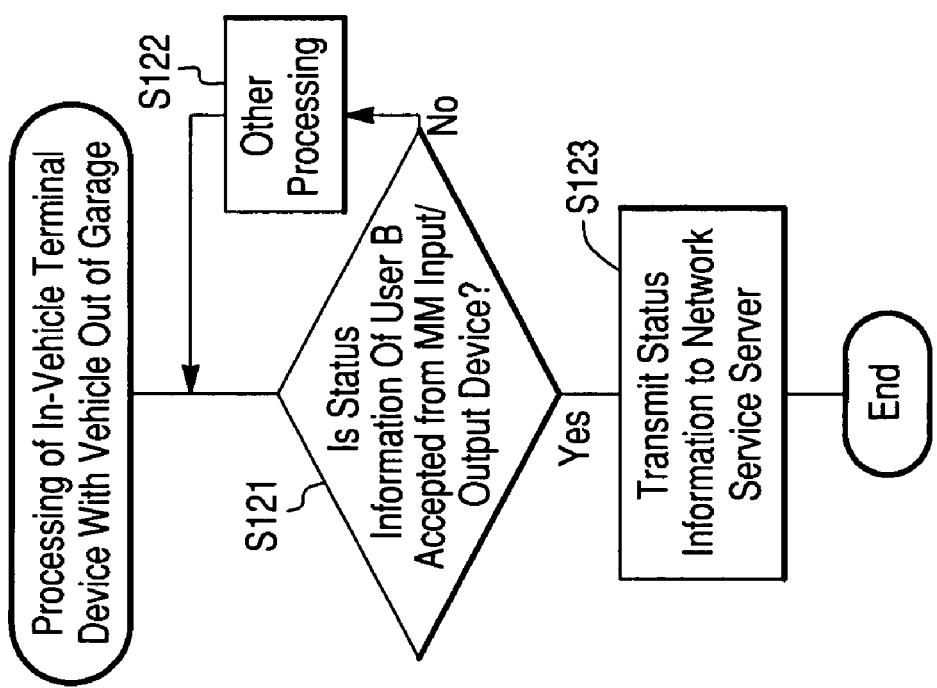

First, it is determined in S121 of FIG. 19C whether the status information from the user B to the user A is accepted in the MM input/output device 35 of the in-vehicle terminal device 3. Here, if it is determined that the status information from the user B is not accepted (NO in S121), the other processing in S122 is carried out, and the judgment processing of S121 is carried out. That is, the processing of S121 and S122 corresponds to the processing carried out in the in-vehicle terminal device 3 until the status information from the user B is accepted.

If it is determined in S121 that the status information from the user B is accepted, the status information from the user B to the user A is provided to the network service server 5 in S123, and then the processing is finished. Here, immediately after the processing is finished, the above processing is repeated from S121.

Subsequently, it is determined in S124 of FIG. 19D whether a reply from the user A to the user B is received from the network service server 5. Here, if it is determined that the response from the user A is not received (NO in S124), the other processing in S125 is carried out, and the judgment processing of S124 is carried out. That is, the processing of S124 and S125 corresponds to the processing carried out in the in-vehicle terminal device 3 until the status information from the user A is received.

If it is determined in S124 whether the reply from the user A is accepted, the reply from the user A is provided to the user B in S126, and the processing is finished. Immediately after the processing is finished, the above processing is repeated from S124 again.

Next, the warning and the attachment operation of the vehicle 1 will be described.

FIG. 20 shows a specific example of the warning. Under a normal state where intrusion of any suspicious person is not detected, no activation of the equipment of vehicle 1 is induced. However, when intrusion of a suspicious person is detected, warnings (1) and (2) shown in FIG. 20 are repetitively carried out.

In the warning (1), the headlights are turned on and also the horn is blared for a long time. In the warning (2), the headlights are turned off and also the horn-blaring is stopped. By repeating the warnings (1) and (2) as described above, the headlights are turned on and off at a predetermined interval, and the horn blares at a predetermined interval. Accordingly, the suspicious person is threatened, and psychological pressure is put on the suspicious person.

In the above example, the horn is blared. However, the system may be modified so that other sounds such as a barking sound of a house dog in the garden, etc. are output. Furthermore, a human voice may be output.

FIG. 21 shows a specific example of the attachment operation. Under a normal state where it is not detected that any user returns home, the vehicle equipment is not activated. When it is detected that a user comes back home, attachment operations (performance) (1) to (4) shown in FIG. 21 are carried out.

In the attachment operation (1), the right-hand headlight is turned on, the left-hand headlight is turned off, the turn indicators are turned off and the horn is blared for a short time. In the attachment operation (2), the right-hand headlight is turned off, the left-hand headlight is turned on, and the turn indicators are turned off. In the attachment operation (3), the headlights are turned off, the right-hand turn indicator is turned off, and the left-hand turn indicator is turned on. In the attachment operation (4), the headlights are turned off, the right-hand turn indicator is turned on and the left-hand turn indicator is turned off.

In the attachment operations described above, a movable portion such as wipers or the like may be moved. Furthermore, a new movable portion for the attachment operation may be provided to the vehicle 1.

Figure 22B:
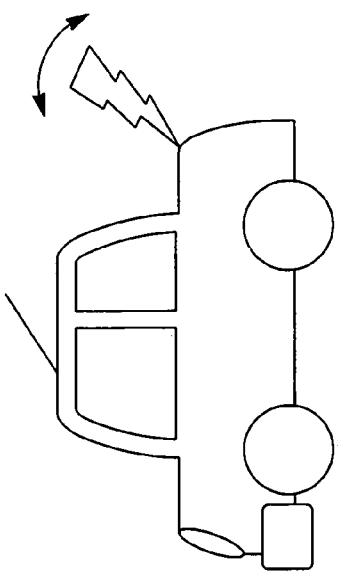
Figure 22A:
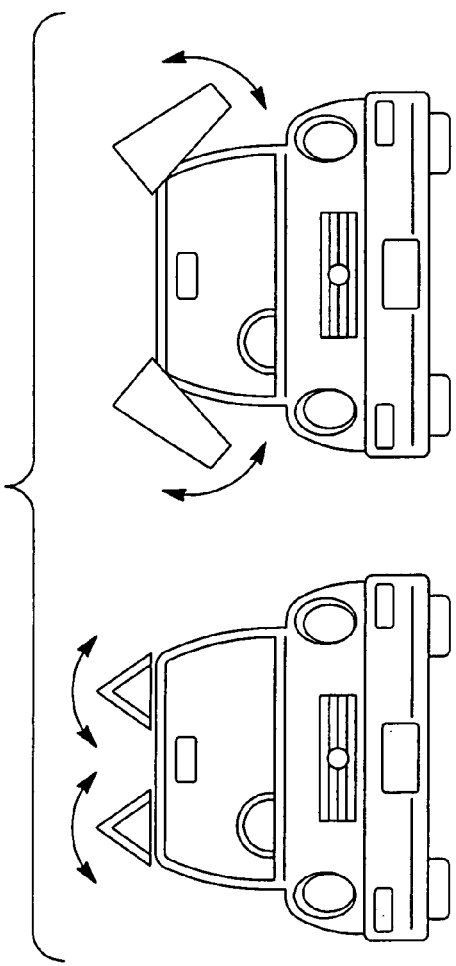

FIGS. 22A and 22B shows specific examples in which movable portions for the attachment operation are provided to the vehicle 1. FIG. 22A shows a case where a movable portion imaging ears of an animal are provided, and FIG. 22B shows a case where a movable portion imaging the tail of an animal is provided to the vehicle 1. By equipping such a movable portion, the cherishability of the vehicle 1 can be enhanced, and a patron base of females, etc. can be achieved, for example.

When the vehicle 1 takes such an attachment operation as described above, the user feels as if he/she has communications with the vehicle 1. That is, the vehicle 1 can be provided with a cherishing function. This cherishing function makes the vehicle 1 behave like a living being, and the user accepts the vehicle 1 with a sense of a new family member living in the same residential property 2.

Next, the psychology of users in the security system will be described.

This security system may be designed so as to monitor intrusion into a residential property 2 (monitoring system), for example. A user using this monitoring system feels that he/she is watched at all times when the user receives a notification from the system, and thus the user may have uncomfortable feeling due to the monitoring of the system. When the user has such uncomfortable feeling, the user tries to reject the monitoring and finally may reject the system and stop the operation of the monitoring system or the like.

On the other hand, according to the security system of at least one embodiment of the present invention, the security operation such as the warning to the suspicious person by the vehicle 1 is carried out. Furthermore, the vehicle 1 takes not only the warning, but also the attachment operation to the user. That is, the vehicle 1 behaviors like a pet which threatens a suspicious person and takes a familiar action to a user. With such a system, the vehicle 1 constituting the monitoring system mimics the affinity of a family member or pet, so that user's discomfort with respect to the constant monitoring as described above can be suppressed.

As described above, the security server device according to this embodiment of the present invention may be provided with an intrusion detection information input unit for receiving intrusion detection information from an intrusion detection device for detecting intrusion of an object into a predetermined area, and a network communication unit for carrying out communication processing with an in-vehicle terminal device mounted in a vehicle through a communication network, wherein, when the intrusion detection information input unit receives the intrusion detection information from the intrusion detection device, the network communication unit transmits information concerning the detected intruder to the in-vehicle terminal device.

Accordingly, there can be achieved such an effect that a user can recognize that some object intrudes into a predetermined area while he/she rides in a vehicle and moves.

Furthermore, a notification of the intruder to the user is made by the in-vehicle terminal device mounted in the vehicle, and thus there can be achieved such an effect that the usage of the in-vehicle terminal device can be expanded, and propagation of the in-vehicle terminal device can be further promoted.

The security server device may be further provided with a data storage unit for storing authentication information data base concerning intruders, and designed so that when intrusion detection information is received from the intrusion detection device, information concerning a detected intruder is collated with the authentication information data base to specify the detected intruder, and the network communication unit transmits the information concerning the intruder thus specified to the in-vehicle terminal device.

With this construction, in addition to the effect described above, there can be also achieved such an effect that a user riding in a vehicle can recognizes which intruder object intrudes, and thus he/she can take a suitable countermeasure, for example, leaves it as it is (i.e., takes no action), rapidly returns back to the place concerned, informs a security company or the like in accordance with the type of the intruder.

Furthermore, the security server device may be designed so that the authentication information data base stores data for identifying which one of a suspicious person, an acquaintance and a user the intruder is.

Accordingly, in addition to the effects described above, the user riding in the vehicle can recognize which one of a suspicious person, an acquaintance and another user the intruder is, and thus can take a more appropriate countermeasure.

Still furthermore, the security server device according to embodiments of the present invention may be designed so that the network communication unit transmits image information of an intruder to the in-vehicle terminal device and also receives authentication information of the intruder concerned from the in-vehicle terminal device. In addition, the data storage unit renews the authentication information data base on the basis of the authentication information received from the in-vehicle terminal device.

Accordingly, in addition to the effects described above, there can be achieved such an effect that the contents of the authentication information data base can be renewed to appropriate contents at all times, and thus the specifying precision of the intruder can be enhanced. Furthermore, even the user riding in the vehicle can renew the contents of the authentication information data base, so that the convenience to the user can be enhanced.

The security server device may be further provided with a parking detection information input unit for receiving parking detection information indicating parking of a vehicle from a parking detection device for detecting whether the vehicle is parked in a predetermined parking area, and designed so that when the parking detection information is received by the parking detection information input unit, the network communication unit does not transmit the information concerning the detected intruder to the in-vehicle terminal device.

Accordingly, in addition to the effect of the above arrangement, unnecessary communication processing can be avoided, and thus there can be achieved such an effect that saving of a communication cost, reduction in the communication processing load in the security server device, etc. can be implemented.

Furthermore, the security server device may be further provided with an input unit for accepting an input from a user, and designed so that the network communication unit transmits to the in-vehicle terminal device a message created on the basis of the input from the user, and also receives a message created by the user riding in the vehicle from the in-vehicle terminal device.

Accordingly, in addition to the effects described above, there can be also achieved such an effect that when the security server device is set up at home, a user at home can inform an status or the like to another user riding in a vehicle, and also the user riding in the vehicle can transmit a reply to the user at home.

Furthermore, this embodiment of the in-vehicle terminal device is mounted in a vehicle, and provided with a network communication unit for carrying out communication processing with the security server device through a communication network, a display unit for displaying information and an input unit for accepting an input from a user, wherein the display unit displays information concerning a detected intruder which is transmitted from the security server device.

Accordingly, the information concerning security issues can be immediately informed to a user riding in a vehicle, and also the user style of the in-vehicle terminal device can be expanded.

Furthermore, the security server device is further provided with an intrusion detection information input unit for receiving intrusion detection information from an intrusion detection device for detecting intrusion of a person into a predetermined area, a parking detection information input unit for receiving parking detection information indicating parking of a vehicle from a parking detection device for detecting whether the vehicle is parked in a predetermined parking area, and a network communication unit for carrying out communication processing with an in-vehicle terminal device mounted in a vehicle through a communication network, wherein the intrusion detection information input unit receives intrusion detection information from the intrusion detection device, and the when the parking detection information is received by the parking detection information input unit, the network communication unit makes an instruction to the in-vehicle terminal device to carry out the warning by the vehicle.

Accordingly, the treating operation is conducted on the intruder by the vehicle, and thus it is expected that the intruder has such an illusion that someone is in the vehicle or he/she is surprised that the alarm has issued from an unexpected place and runs away.

In addition, the vehicle itself is used as a device for emitting such an alarm, and thus the security system as described above can be easily constructed without newly providing any alarming device.

Furthermore, the usage of the in-vehicle terminal device can be expanded, so that propagation of the in-vehicle terminal device can be further promoted.

The security server device may be further provided with a data storage unit for storing an authentication information data base concerning intruders, and designed so that when receiving intrusion detection information from the intrusion detection device, the information concerning a detected intruder is collated with the authentication information data base to judge whether the detected intruder is a suspicious person or not, and the network communication unit instructs the in-vehicle terminal device so that the vehicle carries out the warning only when the intruder is a suspicious person.

Accordingly, in addition to the effects described above, for example when an acquaintance visits or a user comes back, the warning can be prevented from being carried out.

Furthermore, the security server device may be designed so that when intrusion detection information is received from the intrusion detection device, information concerning a detected intruder is collated with the authentication information data base to judge whether the detected intruder is a user or not, and the network communication unit instructs the in-vehicle terminal device so that the vehicle carries out the attachment operation only when the intruder is a user.

Accordingly, in addition to the effects described above, there can be achieved such an effect that the vehicle can be provided with an attachment function. Therefore, the attachment function enables the vehicle to behave as if it is a living being, and a user accepts the vehicle with such a feeling that the vehicle is a pet.

Furthermore, the vehicle constituting the security system becomes such an existence having affinity as a family member or pet, so that user's uncomfortable feeling to the monitoring system like he/she is monitored by the monitoring system at all times described above can be suppressed.

The in-vehicle terminal device is mounted in a vehicle, and it comprises a network communication unit for carrying out communication processing with the security server device through a communication network, and an operation controller for controlling the vehicle so that the vehicle carries out the warning and/or the attachment operation, wherein the operation controller enables the vehicle to carry out the warning and/or the attachment operation when a warning instruction and/or an attachment operation instruction is received from the security server device by the network communication unit.

Accordingly, when the intruder is a suspicious person, the vehicle is made to carry out the warning, so that the vehicle can be enabled to function as a part of the security system. In addition, when the intruder is a user, the vehicle is made to carry out the attachment operation, so that the user is made to feel as if the vehicle is a user's pet.

Furthermore, the usage of the in-vehicle terminal device can be expanded, so that the propagation of the in-vehicle terminal device can be further promoted.

Still furthermore, the in-vehicle terminal device may be designed so that the operation controller controls the operation of at least one of each head lamp, a horn, each turn indicator and each wiper to carry out the warning and/or the attachment operation.

Accordingly, in addition to the effects, the system as described above can be easily introduced without adding any new construction to the vehicle.

While the invention have been described with reference to only a limited number of embodiments, it will be understood by the person skilled in the intruder detection art of those most closely related thereto, that various changes and modifications can be made without departing from the scope of the invention which is limited only by the appended claims.

What is claimed is:

1. A security arrangement comprising:
   an intrusion detection information input unit for receiving intrusion detection information from an intrusion detection device for detecting an intruding entity entering a predetermined area; and
   a network communication unit for communicating with an in-vehicle terminal device which is mounted in a vehicle through a communication network, wherein when the intrusion detection information input unit receives the intrusion detection information from the intrusion detection device, the network communication unit transmits information related to the detected intruding entity to the in-vehicle terminal device; and
   a data storage unit for storing an authentication information data base containing data for discriminating between detected intruding entities and for authenticating the detection of predetermined intruding entities,
   wherein when intrusion detection information is received from the intrusion detection device, the information concerning the intruder thus detected is collated with data from the authentication information data base which relates to the intruding entity, and the network communication unit transmits the information concerning the specified intruder to the in- vehicle terminal device, and
   wherein the network communication unit transmits image information relating the intruding entity to the in-vehicle terminal device and receives authentication information relating to the detected intruding entity from the in-vehicle terminal device, and wherein the data storage unit renews the authentication information data base on the basis of authentication information received from the in-vehicle terminal device.

2. The security arrangement according to claim 1, wherein the authentication information data base stores data for discriminating between a suspicious person, an acquaintance and a user.

3. The security arrangement according to claim 1, further comprising an input unit for accepting an input from a user, wherein the network communication unit transmits a message created on the basis of the input from the user to the in-vehicle terminal device and also receives a message from the user riding in the vehicle.

4. A security arrangement comprising:
   an intrusion detection information input unit for receiving intrusion detection information from an intrusion detection device for detecting an intruding entity entering a predetermined area;
   a network communication unit for communicating with an in-vehicle terminal device which is mounted in a vehicle through a communication network, wherein when the intrusion detection information input unit receives the intrusion detection information from the intrusion detection device, the network communication unit transmits information related to the detected intruding entity to the in-vehicle terminal device; and
   a parking detection information input unit for receiving parking detection information indicating parking of a vehicle concerned from a parking detection device for detecting whether the vehicle concerned is parked in a predetermined parking area,
   wherein, when the parking detection information is received by the parking detection information input unit, the network communication unit does not transmit the information concerning the detected intruding entity to the in-vehicle terminal device.

5. A security arrangement comprising:
   an intrusion detection information input unit for receiving intrusion detection information from an intrusion detection device for detecting intrusion of a person into a predetermined area;
   a parking detection information input unit for receiving parking detection information indicating parking of a vehicle from a parking detection device for detecting whether the vehicle is parked in a predetermined parking area; and
   a network communication unit for carrying out communication processing through a communication network with an in-vehicle terminal device mounted in a vehicle, wherein when the intrusion detection information input unit receives the intrusion detection information from the intrusion detection device and the parking detection information input unit receives the parking detection information, the network communication unit instructs the in-vehicle terminal device to make a threat behavior by the vehicle.

6. A security arrangement comprising:
   an intrusion detection information input unit for receiving intrusion detection information from an intrusion detection device for detecting intrusion of a person into a predetermined area;
   a parking detection information input unit for receiving parking detection information indicating parking of a vehicle from a parking detection device for detecting whether the vehicle is parked in a predetermined parking area;
   a network communication unit for carrying out communication processing through a communication network with an in-vehicle terminal device mounted in the vehicle, wherein when the intrusion detection information input unit receives the intrusion detection information from the intrusion detection device and the parking detection information input unit receives the parking detection information, the network communication unit instructs the in-vehicle terminal device to indicate a threat behavior by the vehicle; and
   a data storage unit for storing authentication information data base concerning intruders, wherein when the intrusion detection information is received from the intrusion detection device, information concerning a detected intruder is collated with the authentication information data base to identify whether the detected intruder is a suspicious person or not, and the network communication unit sends an instruction to the in-vehicle terminal device to make the vehicle indicate the threat behavior only when the intruder is a suspicious person.

7. The security arrangement according to claim 6, wherein when the intrusion detection information is received from the intrusion detection device, the information concerning the detected intruder is collated with the authentication information data base to identify whether the detected intruder is a user or not, and the network communication unit instructs the in-vehicle terminal device so that the vehicle is made to carry out an attachment operation only when the intruder is a user.

8. An in-vehicle terminal device mounted in a vehicle, comprising:

a network communication unit for carrying out communication processing through a communication network with a security arrangement that comprises:

an intrusion detection information input unit for receiving intrusion detection information from an intrusion detection device for detecting intrusion of a person into a predetermined area;

a parking detection information input unit for receiving parking detection information indicating parking of a vehicle from a parking detection device for detecting whether the vehicle is parked in a predetermined parking area; and a network communication unit for carrying out communication processing through a communication network with an in-vehicle terminal device mounted in the vehicle, wherein when the intrusion detection information input unit receives the intrusion detection information from the intrusion detection device and the parking detection information input unit receives the parking detection information, the network communication unit instructs the in-vehicle terminal device to indicate a threat behavior by the vehicle; and an operation controller for enabling the vehicle to carry out at least one of a warning and an attachment operation, wherein when the network communication unit receives at least one of a warning instruction and an attachment operation instruction from a security server device, the vehicle is made to carry out the action concerned.

9. The in-vehicle terminal device according to claim 8, wherein the operation controller controls at least one of each head lamp, a horn, each turn indicator and each wiper so that the vehicle is made to carry out the at least one of the warning and the attachment operation.

10. The security arrangement according to claim 5, wherein the threat behavior corresponds to at least one of: a) turning off and on at least one head lamp of the vehicle, b) turning off and on at least one turn indicator of the vehicle, and c) turning off and on a horn of the vehicle.

11. The security arrangement according to claim 5, wherein the predetermined area corresponds to a house, and wherein the predetermined parking area is located adjacent to the house.

* * * * *